US010551619B2

(12) United States Patent
Suzuki et al.

(10) Patent No.: US 10,551,619 B2
(45) Date of Patent: Feb. 4, 2020

(54) INFORMATION PROCESSING SYSTEM AND INFORMATION DISPLAY APPARATUS

(71) Applicant: Ricoh Company, Ltd., Tokyo (JP)

(72) Inventors: Yuuki Suzuki, Kanagawa (JP); Kenichiroh Saisho, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/597,323

(22) Filed: May 17, 2017

(65) Prior Publication Data

US 2017/0336629 A1  Nov. 23, 2017

(30) Foreign Application Priority Data

May 19, 2016 (JP) .................................. 2016-100858
Mar. 27, 2017 (JP) .................................. 2017-061541

(51) Int. Cl.
*G02B 27/00* (2006.01)
*G02B 27/01* (2006.01)
(Continued)

(52) U.S. Cl.
CPC .......... *G02B 27/0101* (2013.01); *B60K 35/00* (2013.01); *G05D 1/0088* (2013.01);
(Continued)

(58) Field of Classification Search
CPC .......... G02B 27/0101; G02B 2027/014; G02B 2027/0141; G01C 21/365; G05D 1/0223;
(Continued)

(56) References Cited

U.S. PATENT DOCUMENTS 8,346,426 B1 * 1/2013 Szybalski ............. B60W 50/14
701/28
8,676,431 B1 * 3/2014 Mariet ...................... B60T 7/22
701/28

(Continued)

FOREIGN PATENT DOCUMENTS

JP   2005-199992   7/2005
JP   2008-268009   11/2008

(Continued)

OTHER PUBLICATIONS

Partial European Search Report dated Sep. 27, 2017 in European Patent Application No. 17169701.4.

*Primary Examiner* — Yuen Wong
(74) *Attorney, Agent, or Firm* — Xsensus LLP

(57) ABSTRACT

An information processing system includes a memory to store information of a target objective set for a mobile apparatus, and circuitry. The circuitry acquires external information of the mobile apparatus, acquires internal information of the mobile apparatus, generates an autonomous traveling route of the mobile apparatus based on the external information, the internal information, and the information of the target objective, converts the autonomous traveling route of the mobile apparatus to image information based on at least one of the external information and the internal information, and outputs the image information indicating the autonomous traveling route of the mobile apparatus.

17 Claims, 14 Drawing Sheets

US 10,551,619 B2
Page 2

(51) Int. Cl.
*B60K 35/00* (2006.01)
*G05D 1/00* (2006.01)
*G05D 1/02* (2020.01)

(52) U.S. Cl.
CPC ......... *G05D 1/0214* (2013.01); *G05D 1/0223* (2013.01); *G05D 1/0253* (2013.01); *B60K 2370/179* (2019.05); *B60K 2370/1868* (2019.05); *B60K 2370/334* (2019.05); *G02B 2027/014* (2013.01); *G02B 2027/0141* (2013.01)

(58) Field of Classification Search
CPC .. G05D 1/0214; G05D 1/0088; G05D 1/0253; B60K 35/00; B60K 2350/962; B60K 2350/2052; B60K 2350/1084
See application file for complete search history.

(56) References Cited

U.S. PATENT DOCUMENTS

| | | |
|---|---|---|
| 8,706,342 B1 | 4/2014 | Szybalski et al. |
| 8,738,213 B1 | 5/2014 | Szybalski et al. |
| 8,818,610 B1 | 8/2014 | Szybalski et al. |
| 8,903,592 B1 | 12/2014 | Mariet et al. |
| 9,132,840 B1 | 9/2015 | Szybalski et al. |
| RE45,918 E | 3/2016 | Saisho et al. |
| 9,501,058 B1 | 11/2016 | Mariet et al. |
| 9,582,907 B1 | 2/2017 | Szybalski et al. |
| 2006/0187294 A1 | 8/2006 | Saisho et al. |
| 2007/0211326 A1 | 9/2007 | Saisho et al. |
| 2007/0253048 A1 | 11/2007 | Sakai et al. |
| 2008/0055692 A1 | 3/2008 | Saisho et al. |
| 2008/0068689 A1 | 3/2008 | Saisho et al. |
| 2008/0068693 A1 | 3/2008 | Hayashi et al. |
| 2008/0218827 A1 | 9/2008 | Watanabe et al. |
| 2009/0059337 A1 | 3/2009 | Saisho |
| 2011/0002025 A1 | 1/2011 | Tokita et al. |
| 2011/0228368 A1 | 9/2011 | Sakai et al. |
| 2014/0177022 A1 | 6/2014 | Saisho et al. |
| 2015/0277115 A1 | 10/2015 | Inamoto et al. |
| 2015/0370069 A1 | 12/2015 | Saisho et al. |
| 2016/0003636 A1 | 1/2016 | Ng-Thow-Hing et al. |
| 2016/0170487 A1 | 6/2016 | Saisho |
| 2016/0313562 A1 | 10/2016 | Saisho et al. |
| 2016/0334637 A1 | 11/2016 | Saisho et al. |
| 2018/0023970 A1* | 1/2018 | Iguchi .................. B60K 35/00 345/7 |

FOREIGN PATENT DOCUMENTS

| | | |
|---|---|---|
| JP | 2009-093120 | 4/2009 |
| JP | 2015-009677 | 1/2015 |
| JP | 2015-161565 | 9/2015 |
| JP | 2015-219128 | 12/2015 |

* cited by examiner

INFORMATION PROCESSING SYSTEM AND INFORMATION DISPLAY APPARATUS

CROSS-REFERENCE TO RELATED APPLICATION

This application claims priority pursuant to 35 U.S.C. § 119(a) to Japanese Patent Application Nos. 2016-100858, filed on May 19, 2016, and 2017-061541, filed on Mar. 27, 2017 in the Japan Patent Office, the disclosure of which is incorporated by reference herein in its entirety.

BACKGROUND

Technical Field

This disclosure relates to an information processing system and an information display apparatus.

Background Art

Autonomous traveling vehicles mounted with sensing devices such as camera, global positioning system (GPS), laser imaging detection and ranging (LIDAR) have been researched and developed to devise autonomous traveling of vehicles without requiring human operation. The autonomous traveling vehicles can determine an autonomous traveling route to a destination set for the autonomous traveling vehicles based on information acquired from the sensing devices and traffic information.

As to conventional autonomous traveling vehicles, vehicle operators cannot view the autonomous traveling route determined by the autonomous traveling vehicles along with scenes outside the autonomous traveling vehicles. For example, JP-2015-219128-A discloses a navigation apparatus that does not output a route guidance when the autonomous traveling vehicle is traveling with an autonomous traveling mode because the vehicle operator may feel a display of the route guidance may obstruct the view of the vehicle operator when the autonomous traveling vehicle is autonomously traveling, in which the autonomous traveling route is not reported to the vehicle operator during the autonomous traveling.

SUMMARY

As one aspect of the present disclosure, an information processing system is devised. The information processing system includes a memory to store information of a target objective set for a mobile apparatus, and circuitry. The circuitry acquires external information of the mobile apparatus, acquires internal information of the mobile apparatus, generates an autonomous traveling route of the mobile apparatus based on the external information, the internal information, and the information of the target objective, converts the autonomous traveling route of the mobile apparatus to image information based on at least one of the external information and the internal information, and outputs the image information indicating the autonomous traveling route of the mobile apparatus.

As aspect of the present disclosure, another information processing system is devised. The another information processing includes a memory to store information of a target objective set for a mobile apparatus, and circuitry. The circuitry estimates a position of the mobile apparatus, recognizes a position of an object existing in surroundings of the mobile apparatus, generates an autonomous traveling route of the mobile apparatus based on the recognized position of the mobile apparatus and the information of the target objective acquired from the memory, controls at least one of steering, acceleration, and deceleration of the mobile apparatus based on the generated autonomous traveling route of the mobile apparatus, and displays image information indicating the autonomous traveling route or a combination of image information related to the object and the image information indicating the autonomous traveling route of the mobile apparatus.

As aspect of the present disclosure, an information display apparatus employable for an information processing system is devised. The information display apparatus includes circuitry and an optical unit. The circuitry acquires external information of the mobile apparatus, the mobile apparatus settable with information of a target objective, acquires internal information of the mobile apparatus, acquires information related to an autonomous traveling route of the mobile apparatus from an external apparatus, converts the autonomous traveling route of the mobile apparatus to image information based at least one of the external information and the internal information, outputs the image information of the autonomous traveling route of the mobile apparatus. The optical unit projects an image corresponding to the image information indicating the autonomous traveling route of the mobile apparatus to a transmissive reflective member disposed for the mobile apparatus.

BRIEF DESCRIPTION OF THE DRAWINGS

A more complete appreciation of the description and many of the attendant advantages and features thereof can be readily obtained and understood from the following detailed description with reference to the accompanying drawings, wherein.

Figure 1:
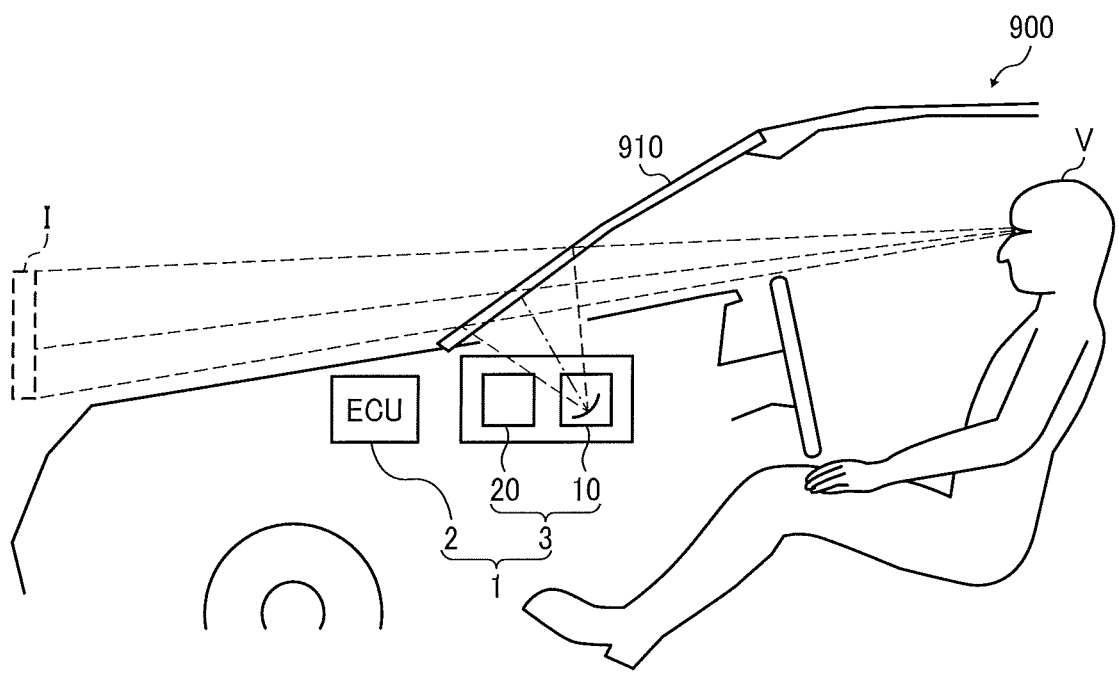
FIG. 1 illustrates an example of a schematic hardware configuration of an information processing system of a first embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

(First Embodiment of Information Processing System)
(Information Display Apparatus)

FIG. 1 illustrates an example of a schematic hardware configuration of an information processing system 1 of a first embodiment of the present disclosure. As illustrated in FIG. 1, the information processing system 1 includes, for example, an electronic control unit (ECU) 2, and an information display apparatus 3. The information processing system 1 can be mounted on a mobile apparatus such as a vehicle 900 that can autonomously travel. The mobile apparatus can be operated autonomously by setting information of a target objective such as a destination of the mobile apparatus as required. The ECU 2 is operated in cooperation with the information display apparatus 3.

In this disclosure, the mobile apparatus can automatically determine at least any one of steering, acceleration, and deceleration without an operation by a person such as a vehicle operator. However, in addition to an autonomous traveling mode of the mobile apparatus, the mobile apparatus can be manually operated by the vehicle operator when a manual operation mode is set.

In this description, the vehicle 900 such as a four-wheel vehicle is described as an example of the mobile apparatus that can autonomously travel, but not limited thereto. For example, a two-wheel vehicle such as a motor cycle, and a drone can be used as the mobile apparatus that can autonomously travel. Further, other mobile apparatuses such as construction machines can be used as the mobile apparatus that can autonomously travel. The vehicle 900 is not limited to any specific type of vehicles and may include various types of vehicles and other machines such as robots.

The information display apparatus 3 projects an image onto a windshield 910, which is positioned at a forward of the vehicle operator V, and displays the image in the field of vision of the vehicle operator V as a virtual image I by superimposing the virtual image I. The information display apparatus 3 is known as a head up display (HUD). The windshield 910 is an example of a transmissive reflective member that passes a part of light that enters the transmissive reflective member, and reflects a remaining part of the light that does not pass the transmissive reflective member.

The information display apparatus 3 can be disposed at any position in view of an interior design of the vehicle 900. For example, the information display apparatus 3 can be disposed on a dashboard of the vehicle 900, and the information display apparatus 3 can be embedded in the dashboard of vehicle 900. The information display apparatus 3 includes, for example, an optical unit 10, and a control unit 20 as illustrated in FIG. 1.

The information display apparatus 3 can display navigation information required for steering the vehicle 900 via the windshield 910 of the vehicle 900 as viewable information. In this description, the navigation information includes, for example, an autonomous traveling route of vehicle, a travel speed of vehicle, a travel direction of vehicle, a distance to a destination (i.e., target objective) set for vehicle, a name of current position of vehicle, information of existence and position of object (i.e., real object) at the forward direction of vehicle, traffic signs such as a speed limit sign, and traffic information such as traffic congestion information at the forward direction of vehicle. In this description, the autonomous traveling route may be simply referred to the traveling route.

The information display apparatus 3 can employ, for example, a panel system and a laser scan system as a project system. The panel system uses an imaging device such as a liquid crystal panel, a digital mirror device (DMD) panel, and a vacuum fluorescent display (VFD) to generate an intermediate image. The laser scan system uses a laser light source and a two dimensional scanning device to generate an intermediate image by scanning a laser beam emitted from the laser light source by the two dimensional scanning device.

The panel system generates an image by emitting light to a panel while partially blocking the light emitted to the panel. The laser scan system generates an image by emitting light to some pixels and not emitting light to another pixels, with which a higher contrasted image can be generated. In this description, the information display apparatus 3 employs the laser scan system as the project system, but not limited thereto.

Figure 2:
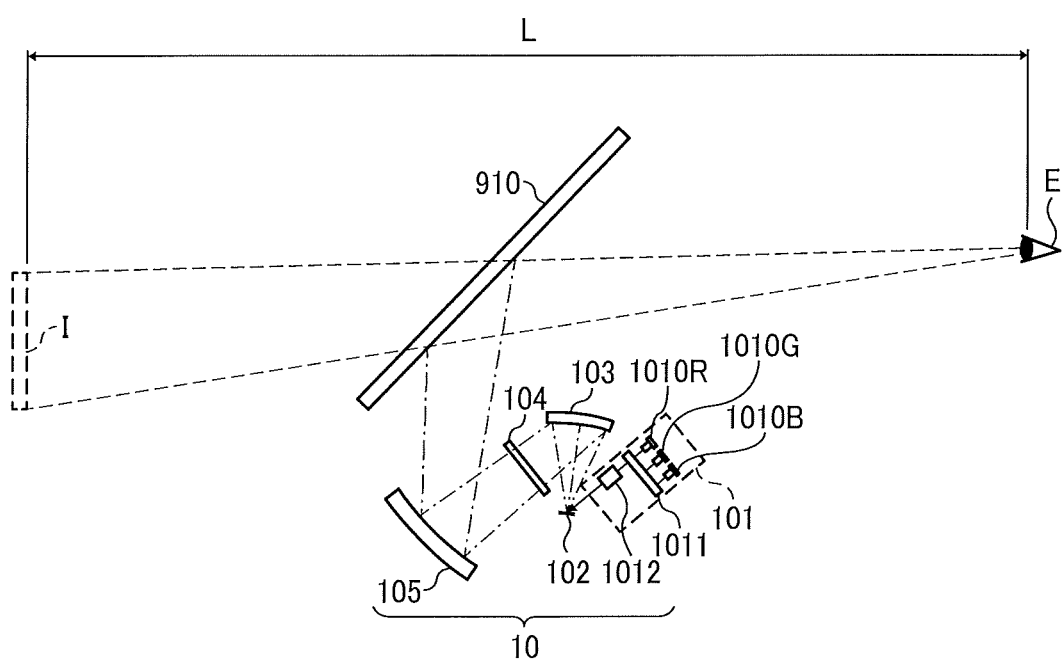
FIG. 2 illustrates an example of a hardware configuration of an optical unit 10 disposed in an information display apparatus used for the information processing system of FIG. 1.

FIG. 2 illustrates an example of a hardware configuration of the optical unit 10 disposed in the information display apparatus 3 used for the information processing system 1 of the first embodiment. As illustrated in FIG. 2, the optical unit 10 includes, for example, a light source unit 101, an optical deflector 102, a mirror 103, a screen 104, and a concave mirror 105.

When the optical unit 10 emits the light used for generating an image (i.e., image light) to the windshield 910, the vehicle operator V can view the virtual image I from a view point E of the vehicle operator V, which is the middle point of the left eye and the right eye of the vehicle operator V. Specifically, the vehicle operator V can view an image (i.e., intermediate image) generated on the screen 104 of the optical unit 10 as the virtual image I via the windshield 910. The intermediate image is used as an image to present or report some information to the vehicle operator V.

A description is given of an example of a hardware configuration of the optical unit 10. As illustrated in FIG. 2, the light source unit 101 includes, for example, light sources such as lasers 1010R, 1010G, and 1010B, a light path synthesizer 1011, and an optical guide unit 1012. Each of the lasers 1010R, 1010G, and 1010B has different peak emission wavelength for light emitted from the lasers 1010R, 1010G, and 1010B.

The laser 1010R is a red (R) light source. For example, the laser 1010R is a red semiconductor laser that emits a laser beam having a peak emission wavelength of 600 nm to 680 nm. The laser 1010G is a green (G) light source. For example, the laser 1010G is a green semiconductor laser that emits a laser beam having a peak emission wavelength of 495 nm to 570 nm. The laser 1010B is a blue (B) light source. For example, the laser 1010B is a blue semiconductor laser that emits a laser beam having a peak emission wavelength of 450 nm to 495 nm.

Each of the laser beams emitted from the lasers 1010R, 1010G, and 1010B passes through a coupling lens and an aperture that are disposed as required, and then enters a light path synthesizer 1011 such as a dichroic mirror, in which the laser beams are synthesized. The synthesized laser beam is guided to a reflection face of the optical deflector 102 via the optical guide unit 1012. The optical guide unit 1012 includes, for example, a plurality of lenses configured with a given pattern.

The laser beam guided to the reflection face of the optical deflector 102 is deflected two dimensionally by the optical deflector 102. The optical deflector 102 can employ, for example, one micro mirror that oscillates about two axes perpendicular with each other, or two micro mirrors that oscillate or pivot about one axis. The optical deflector 102 can be made, for example, as a micro electro mechanical systems (MEMS) device manufactured by semiconductor processes. The optical deflector 102 can be driven, for example, by an actuator that uses deformation of a piezoelectric element as a drive force. Further, the optical deflector 102 can be a galvano mirror, and a polygon mirror.

The laser beam deflected two dimensionally by the optical deflector 102 enters the mirror 103. The mirror 103 reflects the laser beam to a surface of the screen 104 (i.e., scan receiving face) to generate a two dimensional image (intermediate image). The mirror 103 can be, for example, a concave mirror, a convex mirror, and a flat mirror. The screen 104 can be a micro lens array and a micro mirror arrays that diverges the laser beam with a diversion angle. The screen 104 can be any one of a diffusing plate that diffuses the laser beam, a translucent plate having a flat face, and a reflection plate having a flat face.

The laser beam that exits from the screen 104 is reflected by the concave mirror 105, and then enters the windshield 910. A part of light flux entering the windshield 910 passes the windshield 910, and a part of light flux that does not pass the windshield 910 is reflected to the view point E. With this configuration, the vehicle operator V can view the virtual image I via the windshield 910, in which the intermediate image is enlarged as the virtual image I. Specifically, the virtual image I is enlarged and displayed over the windshield 910 when viewed from the vehicle operator V.

Typically, the windshield 910 is not a flat face, but the windshield 910 has a slightly curved face. Therefore, an image focusing position of the virtual image I is determined by a curve face of the concave mirror 105 and the curve face of the windshield 910. The focusing power of the concave mirror 105 is preferably set with a power level that can set a length L from the view point E of the vehicle operator V to the image focusing position of the virtual image I with 4 m to 10 m, and preferably 6 m or less.

Further, at least one of the mirror 103 and the concave mirror 105 is preferably designed and disposed to correct an optical distortion such as convex portion of the horizontal line of the intermediate image convexing to the upward or downward due to the windshield 910 having the slightly curved face.

Further, a combiner such as a transmissive reflective member can be disposed between the view point E and the windshield 910. The virtual image I can be displayed on the combiner by guiding the light from the concave mirror 105 as similar to a configuration that guides the light to the windshield 910 from the concave mirror 105.

Figure 3:
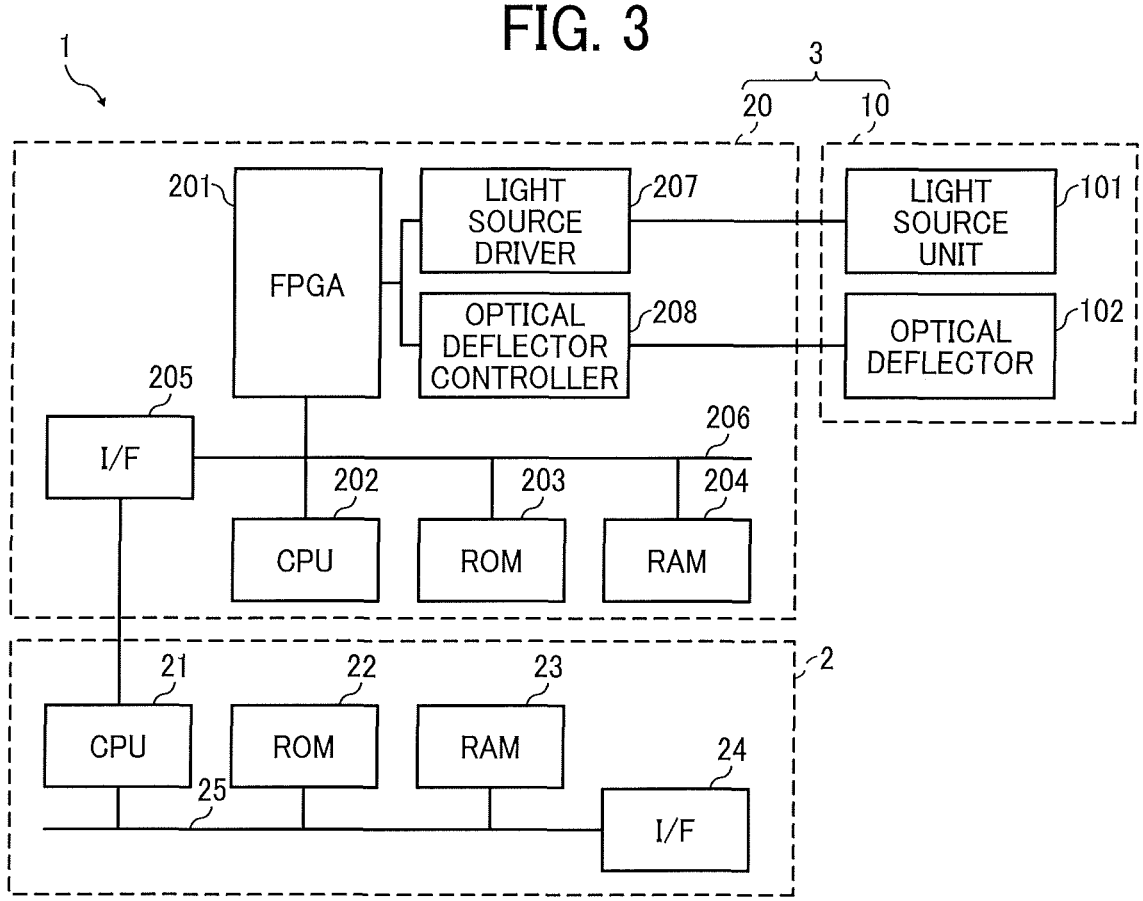
FIG. 3 is an example of a hardware block diagram of the information processing system of FIG. 1.

FIG. 3 is an example of a hardware block diagram of the information processing system 1 of the first embodiment. As illustrated in FIG. 3, the ECU 2 includes, for example, a central processing unit (CPU) 21, a read only memory (ROM) 22, a random access memory (RAM) 23, an interface (I/F) 24, and a bus line 25. The CPU 21, the ROM 22, the RAM 23, and the I/F 24 are connected with each other via the bus line 25.

The CPU 21 controls various capabilities of the ECU 2. The ROM 22, which is a memory, stores one or more programs to be executed by the CPU 21 to control various capabilities of the ECU 2, and various information (e.g., map information). The RAM 23, which is a memory, is used as a working area of the CPU 21. Further, the RAM 23 can store various information (e.g., target objective such as destination set for the vehicle 900) temporarily.

The I/F 24 is used as an interface to connect the ECU 2 with other devices wirelessly or by wire. For example, the I/F 24 is connected to a network such as a controller area network (CAN) of automobiles, and an external network wirelessly or by wire. In this description, the plurality of apparatuses can be connected wirelessly or by wire.

The ECU 2 controls operations of the vehicle 900 such as steering, acceleration, and deceleration of the vehicle 900. Further, the ECU 2 can be operated with the information display apparatus 3.

As to the information display apparatus 3, the control unit 20 includes, for example, a field programmable gate array (FPGA) 201, a CPU 202, a ROM 203, a RAM 204, an I/F 205, a bus line 206, a light source driver 207, and an optical deflector controller 208 such as a micro electro mechanical systems (MEMS) controller. The FPGA 201, the CPU 202, the ROM 203, the RAM 204, and the I/F 205 are connected with each other via the bus line 206.

The FPGA 201 drives the lasers 1010R, 1010G, and 1010B included in the light source unit 101 of the optical unit 10 via the light source driver 207. Further, the FPGA 201 controls an operation of the optical deflector 102 of the optical unit 10 via the optical deflector controller 208.

The CPU 202 controls various capabilities of the information display apparatus 3. The ROM 203 stores one or more programs to be executed by the CPU 202 to control various capabilities of the information display apparatus 3. The RAM 204 is used as a working area of the CPU 202. The I/F 205 is used as an interface to connect the information display apparatus 3 with the ECU 2 wirelessly or by wire.

Figure 4:
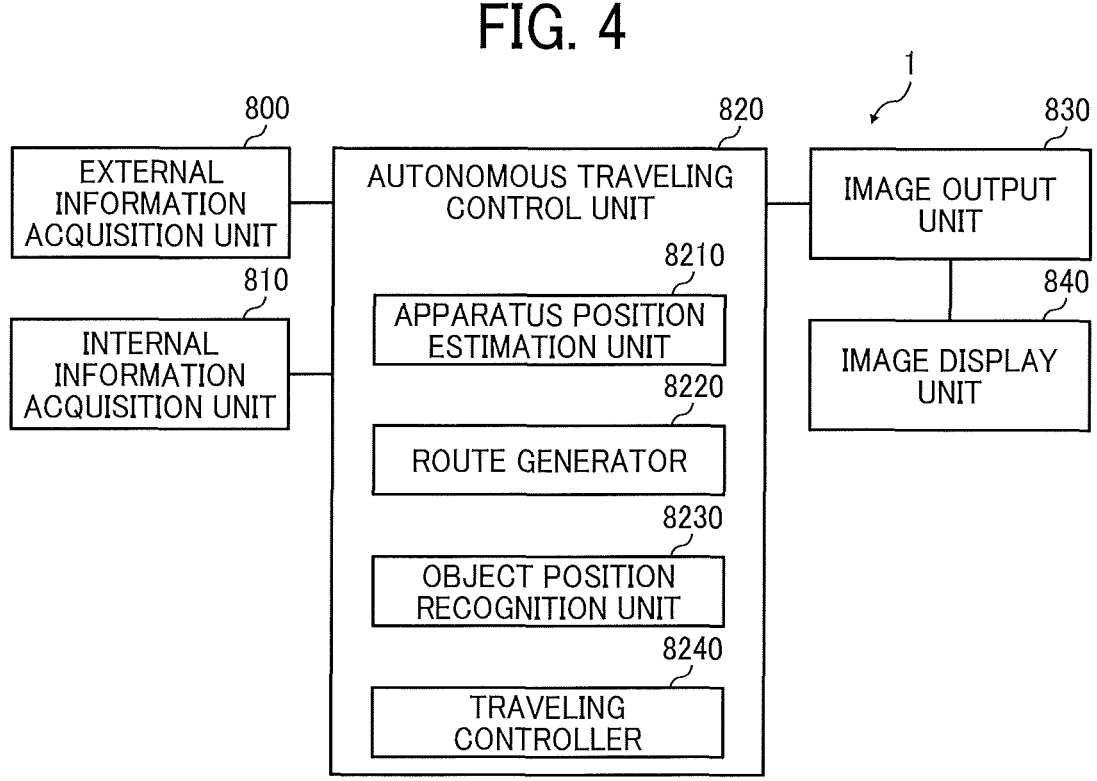
FIG. 4 is an example of a functional block diagram of the information processing system 1 of FIG. 1.

FIG. 4 is an example of a functional block diagram of the information processing system 1 of the first embodiment. As illustrated in FIG. 4, the information processing system 1 includes, for example, an external information acquisition unit 800, an internal information acquisition unit 810, an autonomous traveling control unit 820, an image output unit 830, and an image display unit 840 as functional units of the information processing system 1.

The external information acquisition unit 800 acquires external information of the vehicle 900. The external information acquisition unit 800 can acquire information of objects and environmental information of surroundings of the vehicle 900 by using any sensing devices such as a millimeter-wave radar, an infrared-ray radar, a stereo camera, a monocular camera, and a laser imaging detection and ranging (LIDAR). Further, the external information acquisition unit 800 can acquire traffic information from a network such as vehicle information and communication system (VICS: registered trademark). Further, the external information acquisition unit 800 can acquire position or location information of the vehicle 900 from the GPS system. The external information preferably includes information of an object existing in the surroundings of the vehicle 900 such as at least any one of position, size, and shape of an object existing in the surroundings of the vehicle 900. The acquired external information can further include information related to external conditions of the vehicle 900 that is estimated from the environmental information, traffic information, and position information or the like. In this description, the object means an object existing in the surroundings of the mobile apparatus such as the vehicle 900. For example, the object means one or more moving objects such as other vehicles and pedestrians in the surroundings of the vehicle 900, and still objects such as traffic signs, trees, and walls.

The internal information acquisition unit 810 acquires internal information of the vehicle 900. The internal information acquisition unit 810 can acquire information of the vehicle 900 such as a traveling speed and a traveled distance of the vehicle 900 from CAN.

The autonomous traveling control unit 820 can read the external information acquired by the external information acquisition unit 800 and the internal information acquired by the internal information acquisition unit 810. Further, the autonomous traveling control unit 820 can read information (e.g., map information) stored in the ROM 22 (FIG. 3), and information (e.g., target objective such as destination set for the vehicle 900) stored in the RAM 23 (FIG. 3).

The autonomous traveling control unit 820 includes, for example, an apparatus position estimation unit 8210, a route generator 8220, an object position recognition unit 8230, and an apparatus controller 8240.

The apparatus position estimation unit 8210 estimates a position or location of the vehicle 900 based on the external information (e.g., environmental information of surroundings of the vehicle 900, information of GPS) acquired by the external information acquisition unit 800.

The route generator 8220 generates an autonomous traveling route of the vehicle 900, and corrects or updates the autonomous traveling route of the vehicle 900 based on the external information acquired by the external information acquisition unit 800 and the internal information acquired by the internal information acquisition unit 810 including the position information of the vehicle 900 estimated by the apparatus position estimation unit 8210 based on the external information and the internal information, information (e.g., map information) stored in the ROM 22 (FIG. 3), and information (e.g., target objective such as destination set for the vehicle 900) stored in the RAM 23 (FIG. 3).

Further, the route generator 8220 can generate a map based on the external information acquired by the external information acquisition unit 800 during the traveling, and the internal information acquired by the internal information acquisition unit 810 during the traveling, and use the generated map to correct or update the autonomous traveling route.

The object position recognition unit 8230 recognizes a position of object existing in the surroundings of the vehicle 900 based on the external information acquired by the external information acquisition unit 800 (e.g., environmental information of surroundings of the vehicle 900).

The apparatus controller 8240 controls at least one of steering, acceleration, and deceleration of the vehicle 900 based on the autonomous traveling route generated by the route generator 8220.

When the CPU 21 (FIG. 3) executes given programs, and performs processing with other one or more hardware resources as required, the external information acquisition unit 800, the internal information acquisition unit 810, and the autonomous traveling control unit 820 can be implemented. Further, a part or the entire of the external information acquisition unit 800, the internal information acquisition unit 810, and the autonomous traveling control unit 820 can be implemented by using other circuit such as a field programmable gate array (FPGA).

The image output unit 830 acquires information related to the autonomous traveling route, the external information acquired by the external information acquisition unit 800, and the internal information acquired by the internal information acquisition unit 810 from the autonomous traveling control unit 820.

Then, image output unit 830 converts the autonomous traveling route to image information based on at least any one of the external information and the internal information, and outputs the image information.

When the image output unit 830 generates the image information, the image output unit 830 can adjust at least one of position, size, shape, color, and brightness of an image to be displayed, and displays the image corresponding to the generated image information.

Further, the image output unit 830 can be configured to receive the external information and the internal information without using the external information acquisition unit 800 and the internal information acquisition unit 810, and the autonomous traveling control unit 820. For example, the image output unit 830 can be configured to receive the external information and the internal information directly from another external information acquisition unit and another internal information acquisition unit.

The image display unit 840 controls the optical unit 10 based on the image information acquired from the image output unit 830, and projects an image corresponding to the image information acquired from the image output unit 830 by using the windshield 910. With this configuration, the vehicle operator V can view the virtual image I from the view point E.

Further, the image display unit 840 can be omitted from the information processing system 1. For example, the image information output by the image output unit 830 can be displayed by using other display device. The other display device can be, for example, a display used for a car navigation system, an instrument panel, and a display device used by the vehicle operator V such as a smartphone and a personal computer. When the image information is displayed on the other display device, an image of the travel route and an image of object that is to be reported to the vehicle operator V can be displayed on the other display device by superimposing the image of the travel route and the image of the object over the image information of an actual scene captured by a camera.

When the CPU 202 (FIG. 3) executes given programs, and performs processing with other one or more hardware resources as required, the image output unit 830 and the image display unit 840 can be implemented. Further, a part or the entire of the image output unit 830 and the image display unit 840 can be implemented by the FPGA 201.

Further, the apparatus position estimation unit 8210 and the object position recognition unit 8230 can be integrated as a recognition module. Further, the route generator 8220 and the apparatus controller 8240 can be integrated as an autonomous traveling control module. Further, the image output unit 830 and the image display unit 840 can be integrated as a display module. By employing this module configuration for the information processing system 1, the information processing system 1 can be configured easily.

(Display of Autonomous Traveling Route)

Figure 5:
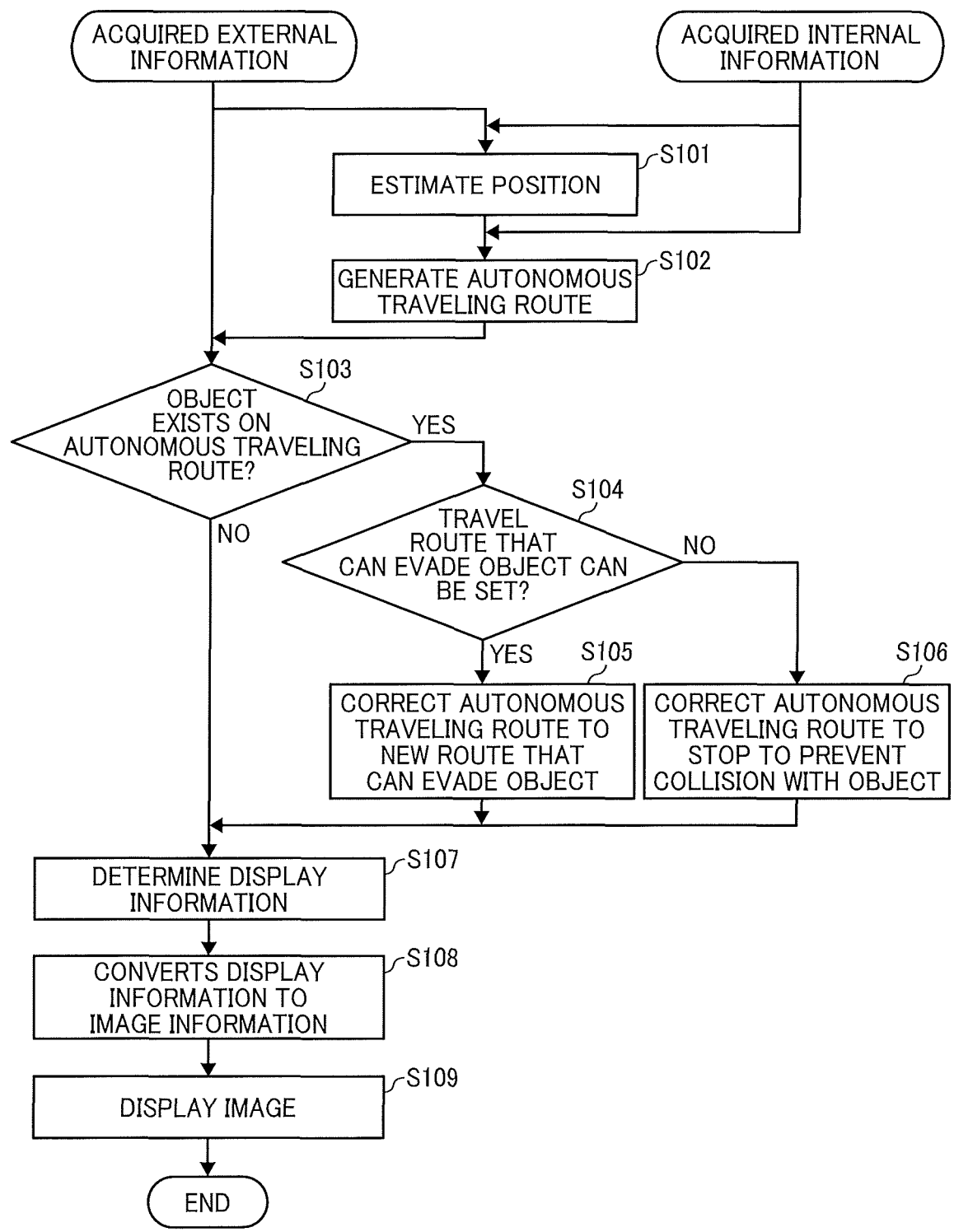
FIG. 5 is a flow chart describing steps of an operation performed in the information processing system of the first embodiment.

A description is given of an operation of the information processing system 1 when displaying an autonomous traveling route with reference to FIG. 5, which is a flow chart describing steps of an operation performed in information processing system 1, in which it is assumed that the vehicle 900 is being operated under the autonomous traveling mode.

At step S101, the apparatus position estimation unit 8210 estimates a position or location of the vehicle 900 based on external information acquired from the external information acquisition unit 800, and internal information acquired from the internal information acquisition unit 810. In this description, the external information means, for example, environmental information of surroundings of the vehicle 900 and information acquired from a GPS system while the internal information means, for example, a traveling speed of the vehicle 900.

At step S102, the route generator 8220 generates an autonomous traveling route of the vehicle 900 based on the external information acquired from the external information acquisition unit 800, map information acquired from the ROM 22, information of a target objective (i.e., target objective information) set for the vehicle 900 acquired from the RAM 23, the internal information acquired from the internal information acquisition unit 810, and position or location information of the vehicle 900 acquired from the apparatus position estimation unit 8210.

At step S103, the object position recognition unit 8230 determines whether an object exists on the autonomous traveling route of the vehicle 900 based on the external information acquired from the external information acquisition unit 800. When the object position recognition unit 8230 determines that the object exists on the autonomous traveling route of the vehicle 900 (S103: YES), the sequence proceeds to step S104. By contrast, when the object position recognition unit 8230 determines that the object does not exist on the autonomous traveling route of the vehicle 900 (S103: NO), the sequence proceeds to step S107.

At step S104, the route generator 8220 determines whether a travel route that can evade the object is settable based on the external information acquired from the external information acquisition unit 800. When the route generator 8220 determines that the travel route that can evade the object is settable (S104: YES), the sequence proceeds to step S105. At step S105, the route generator 8220 corrects or updates the autonomous traveling route of the vehicle 900 to evade the object, and the sequence proceeds to step S107.

By contrast, when the route generator 8220 determines that the travel route that can evade the object is not settable (S104: NO), the sequence proceeds to step S106. At step S106, the route generator 8220 corrects or updates the autonomous traveling route of the vehicle 900 such that the vehicle 900 stops the traveling to prevent the collision with the object, and the sequence proceeds to step S107.

At step S107, the image output unit 830 determines information to-be-displayed as the virtual image I. Hereinafter, the information to-be-displayed as the virtual image I is referred to as graphically displayable information in this description. Specifically, based on information related to the autonomous traveling route acquired from the route generator 8220, the image output unit 830 determines the graphically displayable information including information of the autonomous traveling route. The graphically displayable information can further include information not related to the autonomous traveling route. In this description, the information related to the autonomous traveling route means, for example, information of an autonomous traveling route generated by the route generator 8220, information of an autonomous traveling route corrected by the route generator 8220, and information indicating that an autonomous traveling route that can evade the object is not settable.

For example, the image output unit 830 determines to display the autonomous traveling route by using, for example, a plurality of similar graphical images (e.g., similar circles) having different sizes, in which each of the similar graphical images indicates respective one of points on the autonomous traveling route, and the size of the similar graphical images can be changed for each one of the similar graphical images. For example, the size of the graphical image indicating a point closest to the vehicle 900 is set with a largest size, and then the size of the graphical images indicating points farther from the point closest to the vehicle 900 are set gradually smaller. In addition to the plurality of similar circle images indicating the autonomous traveling route, the image output unit 830 can determine to display other graphical image as the graphically displayable information. For example, the image output unit 830 can determine to display a graphical image indicating a position of an object as the graphically displayable information, a graphical image indicating an area required by the vehicle 900 to evade an object as the graphically displayable information, and a graphical image indicating a stop of the vehicle 900 as the graphically displayable information. When the plurality of graphical images is overlapped and displayed over an actual road scene by superimposing the plurality of graphical images, the focal length of each of the graphical images can be changed.

Further, when the route generator 8220 determines whether the autonomous traveling route can evade the detected object, the route generator 822 checks one or more graphical images configuring the autonomous traveling route. Then, the image output unit 830 can change at least any one of size, shape, color, and brightness of the one or more checked graphical images configuring the autonomous traveling route to generate graphically displayable information used for the autonomous traveling route, in which each of the graphical images configuring the autonomous traveling route corresponds to each of points configuring the autonomous traveling route.

At step S108, the image output unit 830 converts the graphically displayable information determined at step S107 to image information based on at least one of the external information and the internal information, and outputs the image information. As above described, the image output unit 830 can acquire the external information and the internal information via the autonomous traveling control unit 820, but the image output unit 830 can be configured to acquire the external information and the internal information directly from one or more units without using the autonomous traveling control unit 820.

For example, when the image output unit 830 acquires information related to the traveling speed of the vehicle 900 as the internal information, the image output unit 830 can generate and output image information to be used for displaying graphical images indicating the autonomous traveling route based on the acquired traveling speed of the vehicle 900. Specifically, the image output unit 830 can adjust at least any one of size, shape, color, brightness of the graphical images, and an interval of adjacent graphical images based on the acquired traveling speed of the vehicle 900 to generate and output the image information.

Further, when the image output unit 830 acquires information related to the traveling speed of the vehicle 900 as the internal information, the image output unit 830 can generate and output image information to be used for displaying graphical images indicating the autonomous traveling route based on the acquired traveling speed of the vehicle 900. Specifically, the image output unit 830 can generate and output image information that indicates the interval of the adjacent graphical images becomes broader as the traveling speed of the vehicle 900 becomes faster, and image information that indicates the interval of the adjacent graphical images becomes narrower as the traveling speed of the vehicle 900 becomes slower.

Further, when the image output unit 830 acquires information related to the traveling speed of the vehicle 900 as the internal information, the image output unit 830 can generate and output image information to be used for displaying graphical images indicating the autonomous traveling route based on the acquired traveling speed of the vehicle 900. Specifically, the image output unit 830 can generate and output image information that indicates a display position of a plurality of similar graphical images becomes higher as the traveling speed of the vehicle 900 becomes faster, and image information that indicates a display position of a plurality of similar graphical images becomes lower as the traveling speed of the vehicle 900 becomes slower.

Further, when the image output unit 830 acquires information related to a surface (e.g., road face) that the vehicle 900 travels as the external information, the image output unit 830 can generate and output image information that indicates the autonomous traveling route, which is to be superimposed and displayed over the road face.

Specifically, the image output unit 830 can generate and output the image information that indicates the autonomous traveling route, which can be generated by adjusting at least any one of size, shape, color, and brightness of the graphical images indicating the autonomous traveling route to fit the graphical images indicating the autonomous traveling route with the road face three dimensionally.

At step S109, the image display unit 840 controls the optical unit 10 based on the image information acquired from the image output unit 830 to project an image corresponding to the image information acquired from the image output unit 830 by using the windshield 910, with which the virtual image I can be viewed from the view point E of the vehicle operator V.

As above described, the information processing system 1 can generate the autonomous traveling route based on the external information, the internal information including the position information of the vehicle 900 estimated by the apparatus position estimation unit 8210 based on the external information and the internal information, and the information of a target objective such as a destination set for the vehicle 900, and converts the generated autonomous traveling route to the image information based on at least one of the external information and the internal information, and outputs the image information. Then, the information processing system 1 can display the image information by using any display device, with which the information processing system 1 can report the autonomous traveling route to the vehicle operator V during the autonomous traveling, and thereby the vehicle operator V can feel the sense of security to the autonomous traveling.

Figure 6:
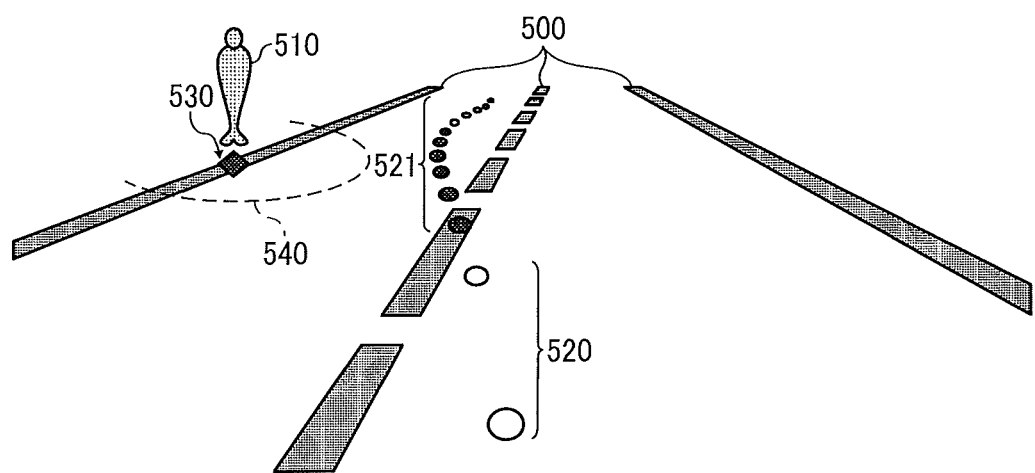
FIG. 6 illustrates an example case of an autonomous traveling route displayed on a windshield when the process of FIG. 5 is performed.

FIG. 6 illustrates an example case of an autonomous traveling route displayed by using the windshield 910 when the process of FIG. 5 is performed, in which the vehicle operator V views information of an autonomous traveling route generated and projected by using the windshield 910 during the autonomous traveling.

In an example case of FIG. 6, a road face 500 (i.e., surface) having two side lines and the center line set between the two side lines, and an object 510 are viewed as a forward direction scene of the vehicle 900. Then, a first autonomous traveling route 520 is displayed as an virtual image by superimposing the first autonomous traveling route 520 over the road face 500, in which a plurality of similar circle images indicating the first autonomous traveling route 520 are set continuously by setting a given interval between the adjacent similar circle images. The object 510 is, for example, a person, a stopped vehicle, a fallen object and so on. In an example case of FIG. 6, the travel route correction (i.e., step S105 of FIG. 5) is not performed.

The plurality of similar circle images indicating the first autonomous traveling route 520 is superimposed over the road face 500 as a scheduled travel route. A geometric shape of the plurality of similar circle images indicating the first autonomous traveling route 520 is adjusted so that the vehicle operator V can perceive that the first autonomous traveling route 520 is virtually present on the road face 500, in which the first autonomous traveling route 520 is fit with the road face 500 three dimensionally when the vehicle operator V views the first autonomous traveling route 520. The adjustment method of geometric shape and three dimensional display method will be described later.

As to the graphical images used for displaying the first autonomous traveling route 520, some of the graphical images is colored with black to indicate that the object presence near the autonomous traveling route of the vehicle 900 is recognized or detected, and to indicate that the correction of the autonomous traveling route is evaluated (i.e., steps S103 and S107 of FIG. 5), with which the vehicle operator V can recognize that the object presence near the autonomous traveling route of the vehicle 900 is recognized or detected, and then the correction of the autonomous traveling route is evaluated although the autonomous traveling route is not changed in an example case of FIG. 6. Specifically, when the route generator 8220 determines whether the vehicle 900 can evade the object by checking one or more points of configuring the autonomous traveling route, color of the checked one or more points of configuring the autonomous traveling route can be changed. With this configuration, the information processing system 1 can report to the vehicle operator V that the correction of the autonomous traveling route is evaluated and the vehicle 900 is traveling safely, with which the vehicle operator V can feel the sense of security.

Further, a diamond mark 530 indicates a position of the object 510, and a dot line 540 indicates an area required to evade the object 510. The diamond mark 530 and the dot line 540 are graphical image information related to the object 510. In an example case of FIG. 6, since the object presence near the autonomous traveling route of the vehicle 900 is recognized without correcting the autonomous traveling route, the diamond mark 530 and the dot line 540 are displayed such that the vehicle operator V can feel the sense of security. Further, the vehicle operator V can feel the sense of security when both of the diamond mark 530 and the dot line 540 are displayed, or when at least any one of the diamond mark 530 and the dot line 540 is displayed.

Figure 7:
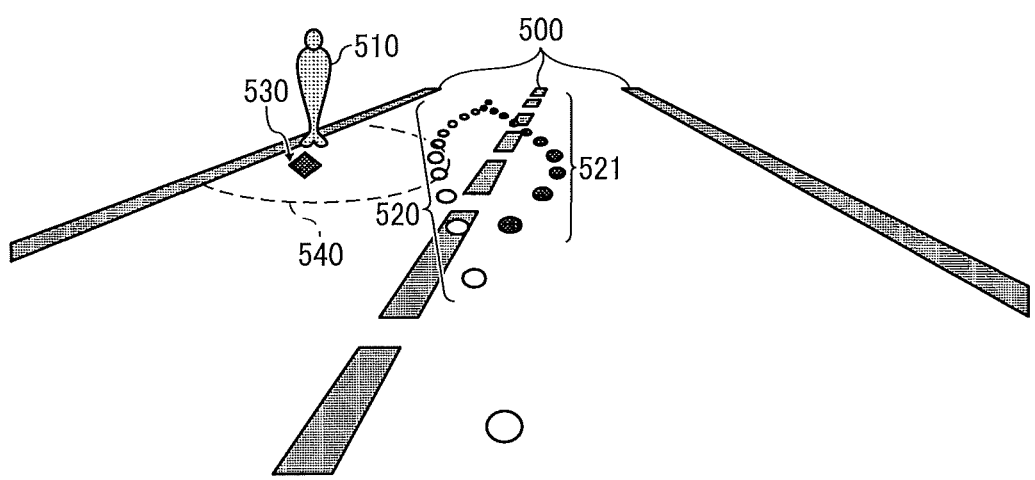
FIG. 7 illustrates another example case of an autonomous traveling route displayed on a windshield when the process of FIG. 5 is performed.

FIG. 7 illustrates an example case of correcting the travel route at step S105 of FIG. 5, in which a second autonomous traveling route 521 is displayed. In an example case of FIG. 7, the autonomous traveling control unit 820 determines that the object 510 exists on the autonomous traveling route (i.e., first autonomous traveling route 520) at step S103 of FIG. 5, and also determines that the travel route that can evade the object is settable at step S104 of FIG. 5, and then corrects the autonomous traveling route (i.e., first autonomous traveling route 520) to a new or alternative autonomous traveling route (i.e., second autonomous traveling route 521) that can evade the object 510 at step S105 of FIG. 5. Further, when the number of objects present on or near the autonomous traveling route is two or more, the diamond mark 530 and the dot line 540 can be set for all of the objects, or the diamond mark 530 and the dot line 540 can be set to a part of the objects. For example, the diamond mark 530 is displayed for all of the objects while the dot line 540 is displayed for an object that causes the change of the autonomous traveling route.

In this description, a post-correction autonomous traveling route (i.e., second autonomous traveling route 521) and a pre-correction autonomous traveling route (i.e., first autonomous traveling route 520) are displayed by changing patterns or styles of the post-correction autonomous traveling route and the pre-correction autonomous traveling route such as by changing colors of the post-correction autonomous traveling route and the pre-correction autonomous traveling route. For example, the post-correction autonomous traveling route (i.e., second autonomous traveling route 521) is indicated by the black circles while the pre-correction autonomous traveling route (i.e., first autonomous traveling route 520) is indicated by the white circles. If both of the post-correction autonomous traveling route and the pre-correction autonomous traveling route are displayed when the autonomous traveling route is corrected, the information processing system 1 can report to the vehicle operator V that the object is correctly detected during the traveling and then the autonomous traveling route is corrected to a safe traveling route, with which the vehicle operator V can feel the sense of security.

Figure 8:
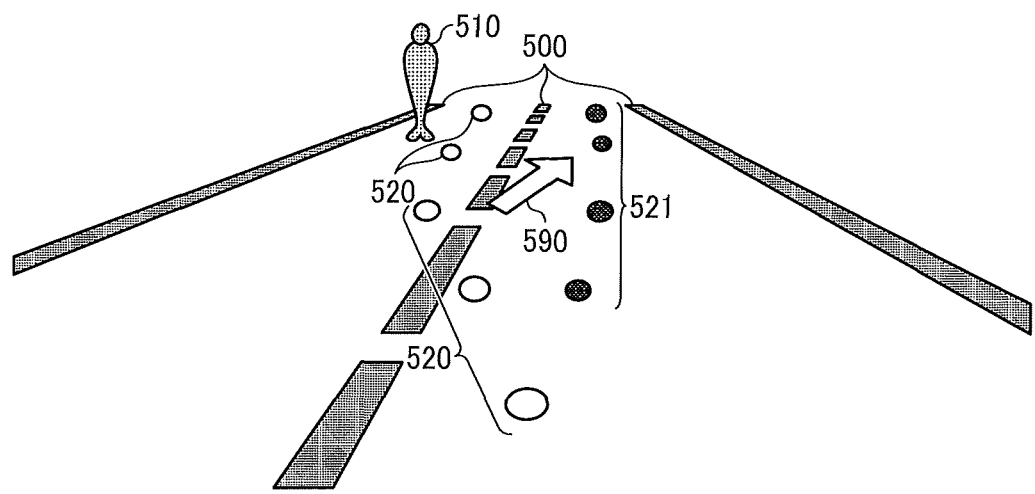
FIG. 8 illustrates another example case of an autonomous traveling route displayed on a windshield when the process of FIG. 5 is performed.

Further, a transitional graphical image can be displayed to distinguish the pre-correction autonomous traveling route and the post-correction autonomous traveling route. For example, as illustrated in FIG. 8, a transitional graphical image 590 can be displayed between the first autonomous traveling route 520 (i.e., pre-correction autonomous traveling route) and the second autonomous traveling route 521 (i.e., post-correction autonomous traveling route). The transitional graphical image 590 can be, for example, an arrow mark. Further, the pre-correction autonomous traveling route can be turned off or erased, or can be faded out gradually. With this configuration, the second autonomous traveling route 521 can be clearly presented to the vehicle operator V, with which the vehicle operator V can feel the sense of security.

Figure 9:
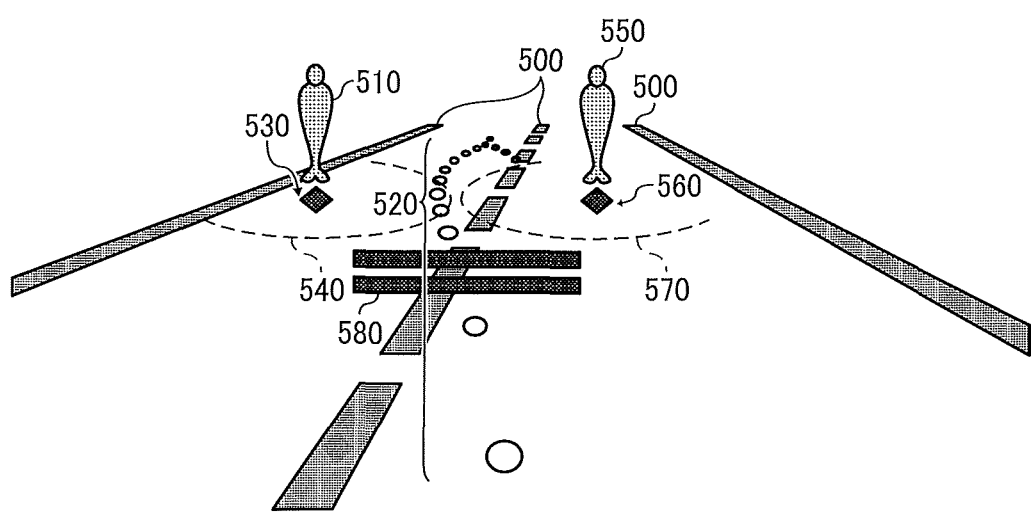
FIG. 9 illustrates another example case of an autonomous traveling route displayed on a windshield when the process of FIG. 5 is performed.

FIG. 9 illustrates an example case when the autonomous traveling control unit 820 determines that the object 510 and another object 550 exist on the autonomous traveling route at step S103 of FIG. 5, and then determines that a travel route that can evade the objects 510 and 550 is not settable at step S104 of FIG. 5. In this example case of FIG. 9, a diamond mark 560 indicates another object 550, and a dot line 570 indicates an area that is required to evade another object 550.

In an example case of FIG. 9, since the autonomous traveling control unit 820 determines that the travel route that can evade the objects 510 and 550 is not settable, the autonomous traveling control unit 820 displays two horizontal lines 580 as a graphical image to indicate that the vehicle 900 is to be stopped soon. With this configuration, the information processing system 1 can report to the vehicle operator V that the vehicle 900 is to be stop soon because the vehicle 900 cannot evade the objects 510 and 550. In an example case of FIG. 9, the first autonomous traveling route 520, which is a scheduled travel route before determining the stop of the vehicle 900, is still displayed. However, the scheduled travel route at a far-side of the graphical image (i.e., two horizontal lines 580) indicating the stop of the vehicle 900 is preferably turned off (i.e., not displayed) so that the information processing system 1 can clearly present to the vehicle operator V that the vehicle 900 is to be stopped, with which the vehicle operator V can further feel the sense of security.

As above described, by displaying the post-correction autonomous traveling route, the information processing system 1 can visually report to the vehicle operator V that the object is correctly detected during the autonomous traveling, and the vehicle 900 is to evade the object, with which the vehicle operator V can feel the sense of security for the autonomous traveling of the vehicle 900.

Further, a display updating frequency of the travel route can be changed based on a priority level of an object, and the display or non-display of the diamond mark 530 and the dot line 540 can be selected based on the priority level of the object. The priority level of the object can be determined by, for example, using an acceleration level of the object. Specifically, when acceleration information of the object is acquired from the external information acquisition unit 800 (e.g., stereo camera), an acceleration vector of the object is detected, in which when the acceleration vector of the object crosses the autonomous traveling route and the traveling direction of the vehicle 900, the priority level is set higher, and when the acceleration vector of the object is small (e.g., object is standing still), the priority level is set lower. Then, the graphically displayable information can be changed based on whether the priority level of object is equal to or greater that a threshold. A description is given of a process of changing the graphically displayable information based on the priority level of an object with reference to FIG. 10.

Figure 10:
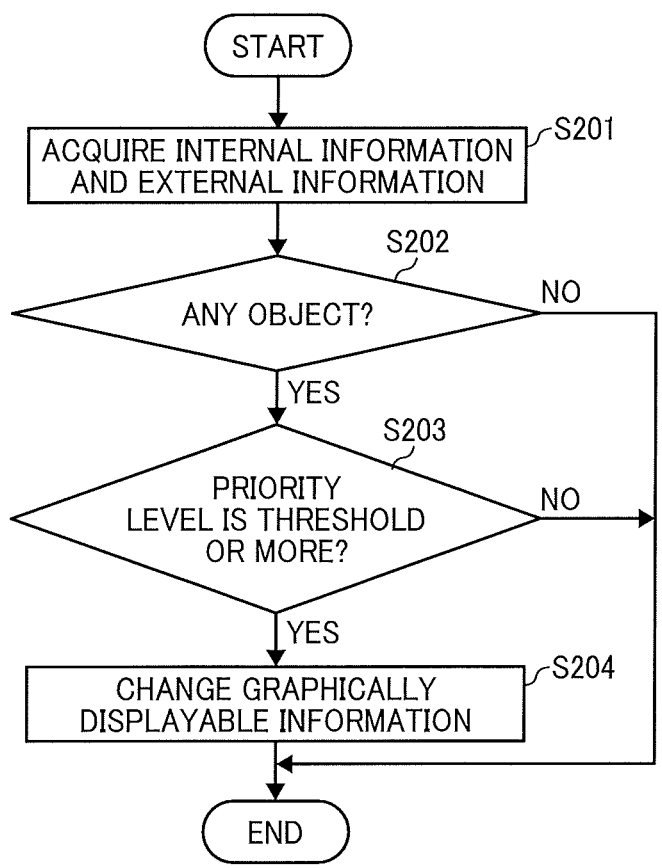
FIG. 10 is a flow chart describing steps of a process of changing graphically displayable information of the first embodiment.

FIG. 10 is a flow chart describing steps of a process of changing the graphically displayable information of the first embodiment. As illustrated in FIG. 10, at step S201, the autonomous traveling control unit 820 acquires the internal information and the external information respectively from the internal information acquisition unit 810 and the external information acquisition unit 800. At step S202, the autonomous traveling control unit 820 determines whether an object exists in the surroundings of the vehicle 900 based on the external information. When the autonomous traveling control unit 820 determines that the object exists in the surroundings of the vehicle 900, the sequence proceeds to step S203, and when the autonomous traveling control unit 820 determines that the object does not exist in the surroundings of the vehicle 900, the sequence is ended.

At step S203, the autonomous traveling control unit 820 determines whether the priority level of the detected object is equal to or greater than a threshold based on information of the detected object and the internal information. When the autonomous traveling control unit 820 determines that the priority level of the detected object is equal to or greater than the threshold, the sequence proceeds to step S204, and when the autonomous traveling control unit 820 determines that the priority level of the detected object is less than the threshold, the sequence is ended. Further, when the autonomous traveling control unit 820 determines that the priority level of the detected object is equal to or greater than the threshold, the autonomous traveling control unit 820 outputs, for example, a lane change signal to the image output unit 830.

At step S204, the image output unit 830 changes the graphically displayable information to set a graphic image indicating the lane change. For example, when one object having a higher priority level and another object having a lower priority level are present on or near the autonomous traveling route, the one object having the higher priority level and another object having the lower priority level are respectively indicated by the diamond mark 530 while the one object having the higher priority level alone is indicated by the dot line 540.

Further, the updating frequency of the graphically displayable information can be changed based on the priority level of the detected object. For example, when an object having a lower priority level is alone present in the surroundings of the vehicle 900, the display of travel route is updated every one second (i.e., updating frequency is set lower), and when an object having a higher priority level is present in the surroundings of the vehicle 900, the display of travel route is updated every 0.2 second (i.e., updating frequency is set higher), which means the graphically displayable information and the display updating frequency or refresh interval can be changed based on the priority level of the detected object. Therefore, the information processing system 1 can prevent confusion of the vehicle operator V, which may be caused by too much information, with which the vehicle operator V can further feel the sense of security.

(Three Dimensional Display)

A description is given of a technology of displaying a geometric shape three dimensionally by adjusting the geometric shape.

Typically, human perceives the depth of space based on two dimensional visual performance in the field of vision (i.e., pictorial depth cues), a difference of visual performance by the left and right eyes and focus adjustment of eyes (i.e., oculomotor cues), and a change of visual performance of an object when a view point moves (i.e., motion parallax). For example, the information display apparatus 3 can display graphical information as a virtual image by using mainly the pictorial depth cues, in which a person can perceive that the virtual image exists at one position in a real space.

When an object exists in the real space, the nearer the distance to the object from a viewer (person), the greater the appearance size of the object for the viewer. Further, the nearer the distance to the object from the viewer, the object is viewed at the lower portion of the field of vision of the viewer. Further, the farther the distance to the object from the viewer, the object is viewed faintly by air thickness from the viewer.

The information display apparatus 3 displays a virtual image by superimposing the virtual image over a forward direction scene viewed by the viewer. Therefore, by adjusting the geometric shape of the graphically displayable information used as the virtual image (geometric transformation) to fit the geometric shape of the graphically displayable information in the real space, the information display apparatus 3 can display the graphically displayable information three dimensionally. Specifically, by using the above described the depth perception by human, the information display apparatus 3 can display the graphically displayable information as if the graphically displayable information exists at one position in the real space when the viewer views the graphically displayable information as the virtual image.

By displaying the graphically displayable information by fitting the graphically displayable information three dimensionally with a real object existing in the surroundings of the vehicle 900, visibility or viewability of the graphically displayable information for the viewer can be enhanced. Further, a virtual image that can fit with the real object existing in the surroundings of the vehicle 900 three dimensionally when viewed from the viewer, and a virtual image that does not fit with the real object existing in the surroundings of the vehicle 900 three dimensionally when viewed from the viewer can be displayed concurrently in a displayable area.

The information display apparatus 3 projects a display image (i.e., virtual image) at a two dimensional position that is determined when designing the information display apparatus 3. Therefore, even if a shape and color of the display image is adjusted to fit the display image at one position in the real space such as at one position over a road face ahead of the view point of the viewer (person), a difference of view such as disparity occurs between the retina of the left eye and the right eye depending on a position displaying the virtual image.

Figure 11:
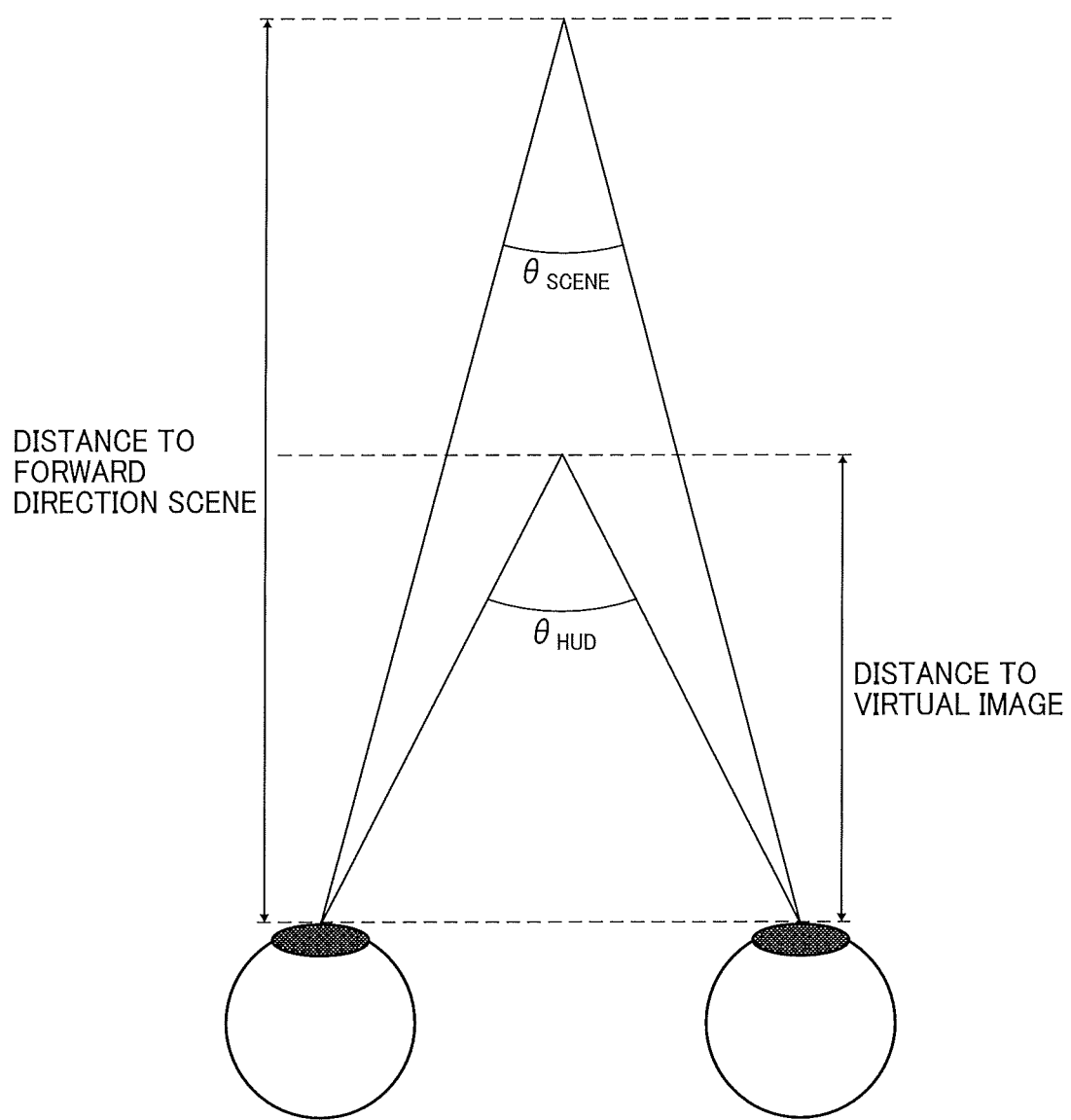
FIG. 11 illustrates a disparity angle when a far point and an virtual image viewed by a viewer.

As illustrated in FIG. 11, an angle formed by lines of sight of the left eye and the right eye and a forward direction scene at a far point is defined as a convergence angle "θscene" to indicate a disparity of the forward direction scene viewed by the viewer eyes, and an angle formed by the lines of sight of the left eye and the right eye and an virtual image displayed by the information display apparatus 3 is defined as a "$\theta_{HUD}$," to indicate a disparity of the virtual image viewed by the viewer eyes. In this configuration, an absolute difference $|\theta_{HUD}-\theta scene|$ is defined as a disparity angle. The convergence angle means an angle formed by the lines of sight of the left eye and the right eye when the viewer views a target.

When the disparity angle exceeds one (1) degree, the viewer may perceive double images, uncomfortableness, and fatigue. Therefore, the information display apparatus 3 is preferably designed to set the disparity angle with one (1) degree or less. For example, when the information display apparatus 3 displays a virtual image at the length L (FIG. 2) such as 4 m to 6 m while an object exists at a distance of 1000 m ahead of the vehicle 900 by setting the disparity angle with one (1) degree or less, the viewer can perceive the virtual image without the disparity while viewing the target object existing in the forward direction scene.

The information display apparatus 3 determines the display image based on the view point E of the viewer, a position of the virtual image, a distance from the view point E of the viewer to the virtual image, a size of the virtual image, and an area to be used for superimposing the virtual image. For example, when a virtual image is superimposed over a road face, a position and distance used for superimposing the virtual image is determined with any values, and the geometric transformation of the virtual image is performed so that the virtual image can be viewed at a target position and distance when viewed from the view point E of the viewer.

When a virtual image is displayed on a flat face such as a flat road face, the virtual image can be displayed by performing the geometric transformation alone. By contrast, when a virtual image is displayed over a non-flat face such as a curved road face and a sloped road face, and when a virtual image is displayed over a white line by superimposing the virtual image, object information is required to be acquired. The object information includes, for example, coordinates of a position (i.e., position information) on a road face used for superimposing the virtual image. Further, when a virtual image is superimposed for objects such an ahead vehicle and pedestrians, the object information means a position information of these objects. Further, the object information can include information related to other objects. The object information can be acquired, for example, from the external information acquisition unit 800 as the external information.

As to the information display apparatus 3, the image output unit 830 adjusts parameters of the display image (i.e., virtual image) such as at least any one of image focus position, size, shape, color, and brightness of the virtual image based on the external information acquired from the external information acquisition unit 800 (e.g., three dimensional position information of object). When the display image that fits with a real object three dimensionally is displayed, parameters of the virtual image are adjusted such that a sense of perspective can be preferably set in line with a position, shape, and size of the real object.

Second Embodiment

A description is given of an example of changing a display in view a traveling speed of the vehicle 900 as a second embodiment.

When the vehicle 900 travels, a distance traveled by the vehicle 900 per unit time (e.g., per second, per minute, per hour) becomes different depending on the traveling speed of the vehicle 900. Therefore, an interval of graphical images displaying the autonomous traveling route such as the first autonomous traveling route 520 is preferably changed when the vehicle 900 is traveling at a higher speed and when the vehicle 900 is traveling at a lower speed.

Figure 12A:
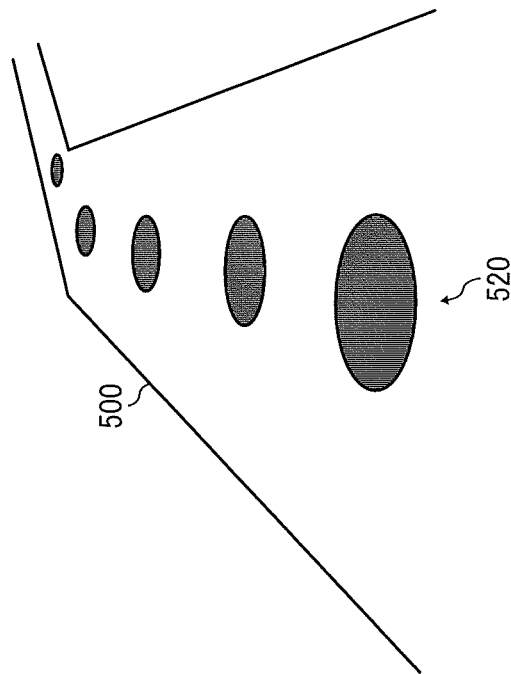
FIGS. 12A and 12B are examples of changing a display in view of a traveling speed of a vehicle.
Figure 12B:
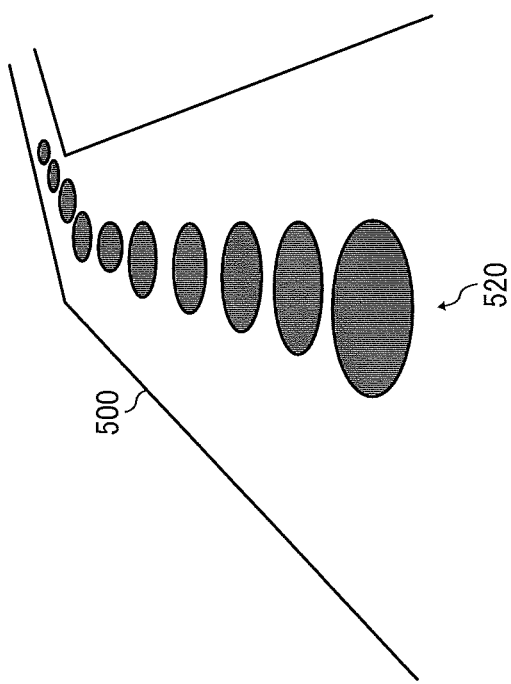

For example, when the vehicle 900 is traveling at a lower speed, the interval of the graphical images is set smaller as illustrated in FIG. 12A. When the vehicle 900 changes the traveling speed to a higher speed from a lower speed, the interval of the graphical images is preferably set greater as illustrated in FIG. 12B, with which visibility or viewability of the vehicle operator V can be enhanced.

The display pattern or styles illustrated in FIG. 12 can be performed when the image output unit 830 acquires information of the traveling speed of the vehicle 900 from the internal information acquisition unit 810 at step S107 of FIG. 5, in which the graphically displayable information including a display position can be determined based on the acquired information of the traveling speed of the vehicle 900.

Third Embodiment

A description is given of another example of changing a display in view a traveling speed of the vehicle 900 as a third embodiment.

It is known that a point of gaze of the vehicle operator V changes as the traveling speed of the vehicle 900 changes. Specifically, when the vehicle 900 is traveling at a lower speed, the point of gaze of the vehicle operator V becomes a lower position, and when the vehicle 900 is traveling at a higher speed, the point of gaze of the vehicle operator V becomes a higher position.

Figure 13B:
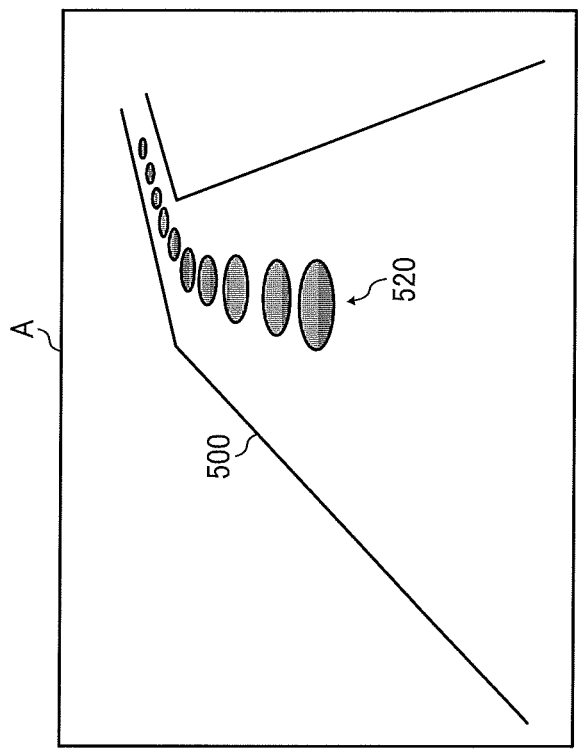
FIGS. 13A and 13B are another examples of changing a display in view of a traveling speed of a vehicle.
Figure 13A:
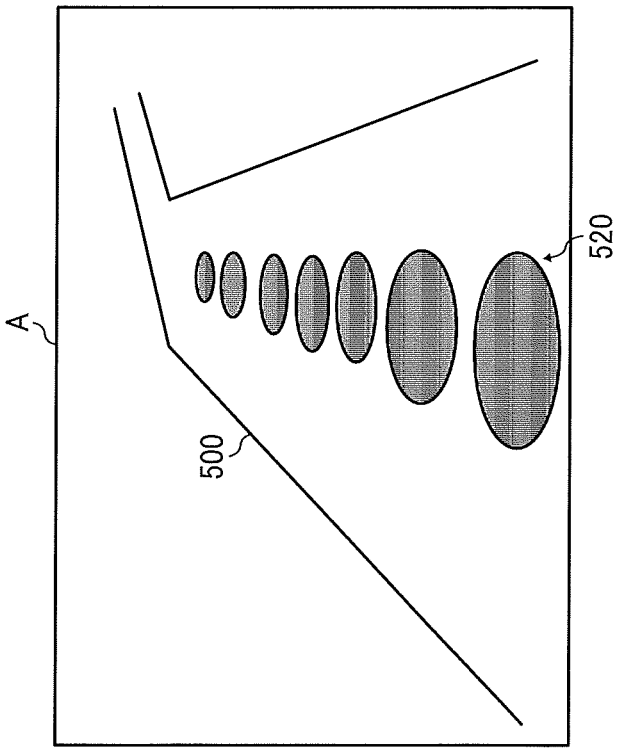

Therefore, as illustrated in FIG. 13A, when the vehicle 900 is traveling at a lower speed, the first autonomous traveling route 520 is displayed at a relatively lower position in a displayable area A of the information display apparatus 3. When the vehicle 900 changes the traveling speed to a higher speed from a lower speed, the first autonomous traveling route 520 is preferably shifted and displayed at a relatively higher position as illustrated in FIG. 13B, With this configuration, the visibility or viewability of the vehicle operator V can be enhanced.

The display pattern or style illustrated in FIG. 13 can be performed when the image output unit 830 acquires information of the traveling speed of the vehicle 900 from the internal information acquisition unit 810 at step S107 of FIG. 5, in which the graphically displayable information including a display position can be determined based on the acquired information of the traveling speed of the vehicle 900.

Fourth Embodiment

A description is given of an example of changing graphically displayable information based on a lane change of the vehicle 900 as a fourth embodiment. The hardware configuration of the information processing system 1 used for the fourth embodiment is same as the hardware configuration of the information processing system 1 of the first embodiment. As to the fourth embodiment, a style of graphically displayable information is changed when it is determined that the lane change of the vehicle 900 will occur during the autonomous traveling, which is different from the first embodiment.

As to the information processing system 1, the autonomous traveling route is constantly updated based on the external information and the internal information. If the graphically displayable information indicating the autonomous traveling route is constantly changed, and the changed graphically displayable information is displayed when each time the graphically displayable information is updated, the display of the graphically displayable information may become unstable, and thereby the vehicle operator V may feel that the unstable displaying of information obstructs the view of the vehicle operator, and may feel insecurity although the lane change is required to be effectively reported to the vehicle operator V to inform a reason of the lane change.

Therefore, the information processing system 1 of the fourth embodiment is configured to report that the lane change is to occur due to the object clearly to the vehicle operator V. Specifically, when the object is detected and then the lane change is to occur due to the detected object, the information processing system 1 explicitly change the graphically displayable information so that an image highlighting a changed portion of the autonomous traveling route can be displayed. With this configuration, the vehicle operator V can easily recognize that the lane change is to occur due to the object, with which the vehicle operator V can further feel the sense of security.

Figure 14:
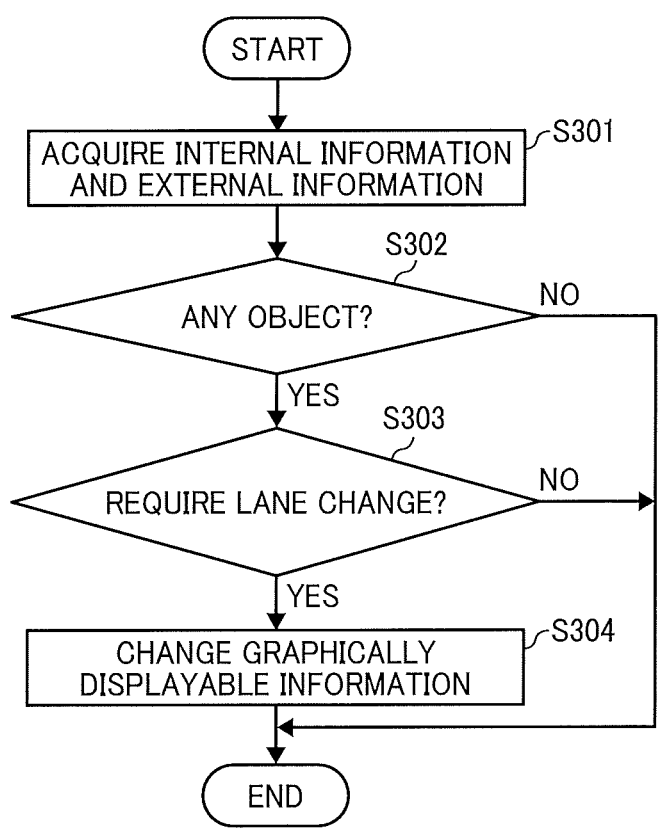
FIG. 14 is a flow chart describing steps of a process of changing graphically displayable information of a fourth embodiment.
Figure 15:
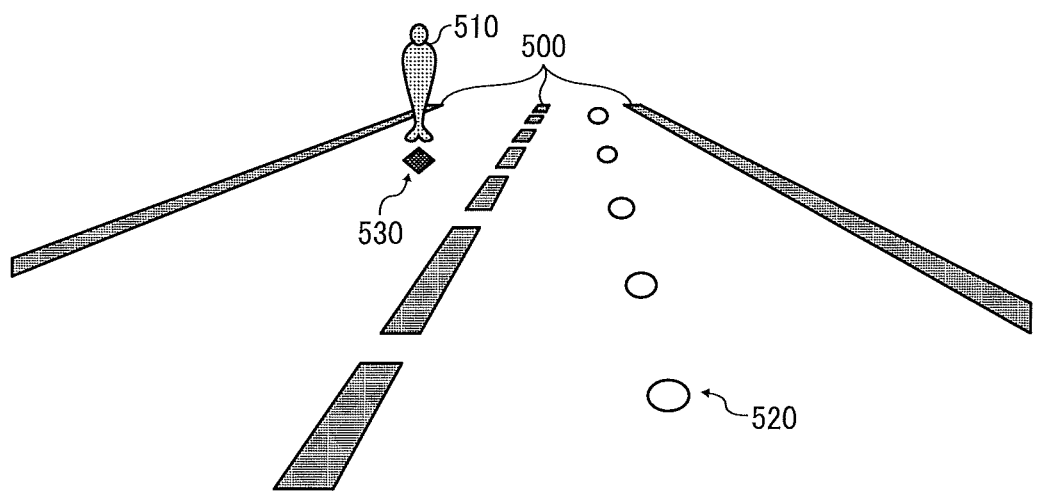
FIG. 15 illustrates an example of graphically displayable information when a lane change will not occur.

FIG. 14 is a flow chart describing steps of a process of changing graphically displayable information of the fourth embodiment. FIG. 15 illustrates an example of graphically displayable information when the lane change will not occur. FIGS. 16 to 19 illustrate examples of graphically displayable information when the lane change is to occur.

As illustrated in FIG. 14, at step S301, the autonomous traveling control unit 820 acquires the internal information and the external information respectively from the internal information acquisition unit 810 and the external information acquisition unit 800. At step S302, the autonomous traveling control unit 820 determines whether an object exists in the surroundings of the vehicle 900 based on the external information. When the autonomous traveling control unit 820 determines that the object exists in the surroundings of the vehicle 900, the sequence proceeds to step S303, and when the autonomous traveling control unit 820 determines that the object does not exist in the surroundings of the vehicle 900, the sequence is ended.

At step S303, the autonomous traveling control unit 820 determines whether the lane change is required for the vehicle 900 based on information of the detected object and the internal information. When the autonomous traveling control unit 820 determines that the lane change is required for the vehicle 900, the sequence proceeds to S304, and when the autonomous traveling control unit 820 determines that the lane change is not required for the vehicle 900, the sequence is ended. Further, when the autonomous traveling control unit 820 determines that the lane change is required for the vehicle 900, the autonomous traveling control unit 820 outputs, for example, a lane change signal to the image output unit 830.

At step S304, the image output unit 830 changes a style of the graphically displayable information to clearly indicate the lane is to be changed. For example, when an image including the first autonomous traveling route 520 indicated by discrete white circles (i.e., first style) and the object 510 indicated by the diamond mark 530 is displayed before changing the lane as illustrated in FIG. 15, an image including the second autonomous traveling route 521 indicated by discrete black circles (i.e., second style) and the object 510 indicated by the diamond mark 530 is displayed after changing the lane as illustrated in FIG. 16, in which the discrete black circles (i.e., second style) indicate a portion of the second autonomous traveling route 521 (i.e., post-correction autonomous traveling route) that is changed from the first autonomous traveling route 520 (i.e., pre-correction autonomous traveling route).

With this configuration, the information processing system 1 can clearly display a graphic image indicating the to-be-occurred lane change due to the presence of the object. Specifically, the information processing system 1 can visually report to the vehicle operator V that the object is correctly recognized or detected during the autonomous traveling, and the autonomous traveling route is generated based on information of the detected object and the internal information, with which the vehicle operator V can feel the sense of security for the autonomous traveling of the vehicle 900.

Figure 16:
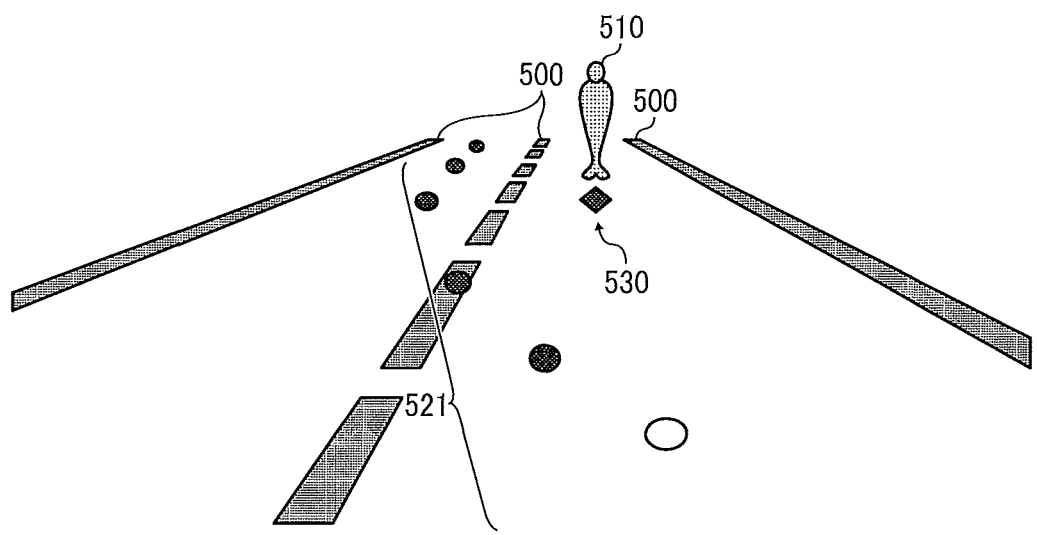
FIG. 16 illustrates example of graphically displayable information when a lane change is to occur.
Figure 17:
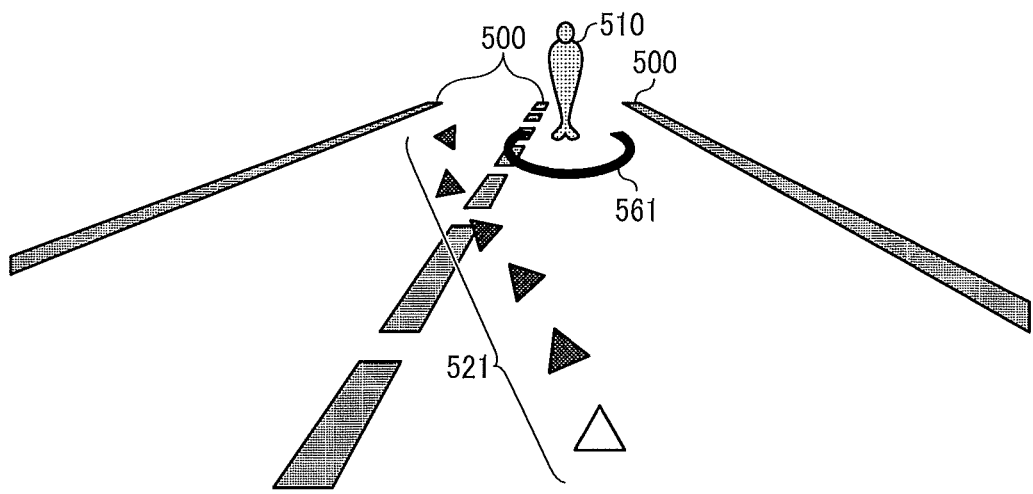
FIG. 17 illustrates another example of graphically displayable information when a lane change is to occur.

Further, as illustrated in FIG. 16, to clearly report a color change from the pre-correction autonomous traveling route to the post-correction autonomous traveling route, the color of the graphical image at the nearest point from the vehicle 900 (e.g., one white circle in FIG. 16) is not preferably changed. Further, a display style of FIG. 16 can be changed to a display style of FIG. 17. As illustrated in FIG. 17 the object 510 can be indicated by a curved line 561, and the second autonomous traveling route 521 can be indicated by a plurality of triangles, in which a traveling direction of the vehicle 900 can be indicated by a corner of the plurality of the triangles.

Figure 18:
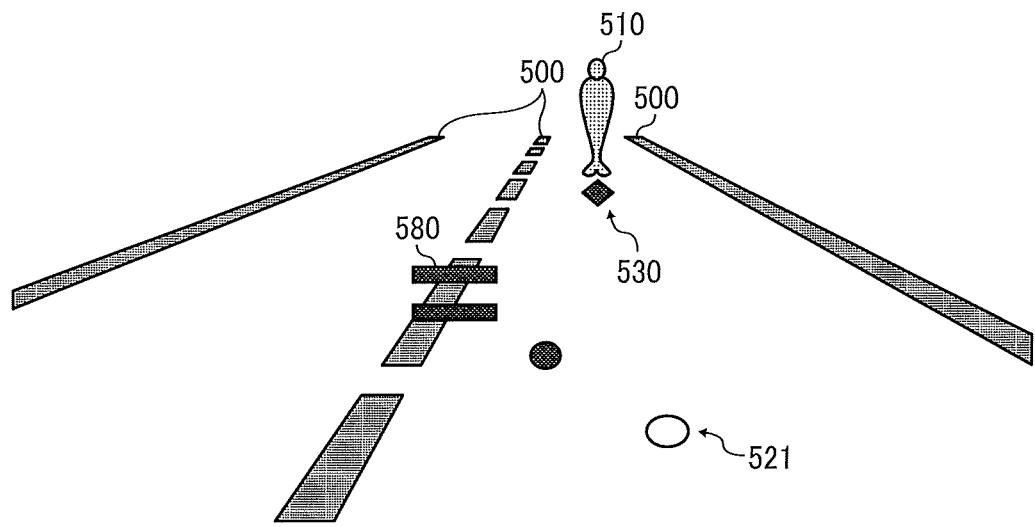
FIG. 18 illustrates another example of graphically displayable information when a lane change is to occur.

Further, as illustrated in FIG. 18, when the lane change is to occur due to the object 510, and the vehicle 900 is required to temporarily stop due to a following vehicle when the lane is to be changed, the two horizontal lines 580 indicating the temporarily stop of the vehicle 900 can be displayed at a position where the autonomous traveling route overlaps the lane.

Figure 19:
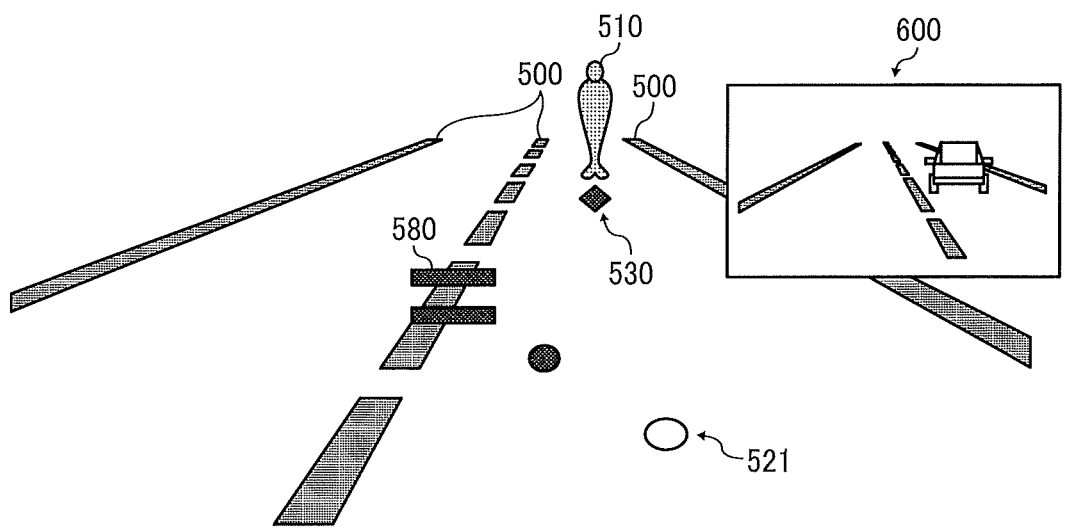
FIG. 19 illustrates another example of graphically displayable information when a lane change is to occur.

Further, when the lane is to be changed, as illustrated in FIG. 19, an outside image generated from the external information (e.g., rearward image acquired by a rearward camera) is preferably displayed at a upper right corner of a screen such as the windshield 910. With this configuration, the information processing system 1 can clearly report to the vehicle operator V that a following vehicle is coming or not coming from the rear of the vehicle 900 when the lane is to be changed, with which the vehicle operator V can feel the sense of security for the autonomous traveling of the vehicle 900.

Fifth Embodiment

A description is given of an example of changing an updating frequency of graphically displayable information based on a lane change of the vehicle 900 as a fifth embodiment. The hardware configuration of the information processing system 1 used for the fifth embodiment is same as the hardware configuration of the information processing system 1 of the first embodiment. As to the fifth embodiment, the updating frequency of graphically displayable information is changed when it is determined that the lane change of the vehicle 900 is to occur during the autonomous traveling, which is different from the first embodiment.

As to the information processing system 1, the autonomous traveling route is constantly updated based on of the external information and the internal information. If the graphically displayable information indicating the autonomous traveling route is constantly changed, and the changed graphically displayable information is displayed when each time the graphically displayable information is updated, the display of the graphically displayable information become unstable, and thereby the vehicle operator V may feel that the unstable displaying of information obstructs the view of the vehicle operator, and may feel insecurity. Therefore, the updating frequency is set, for example, 0.3 to 0.5 second to stabilize the display.

However, when an object such as pedestrians suddenly emerges before the vehicle 900, and the autonomous traveling route can be promptly changed but the graphically displayable information may not be changed promptly, the vehicle operator V feels insecurity. Therefore, when the object is detected and then the lane change is to occur, the updating frequency of the graphically displayable information is increased to change the graphically displayable information right after detecting the object so that the vehicle operator V can feel the sense of security.

Figure 20:
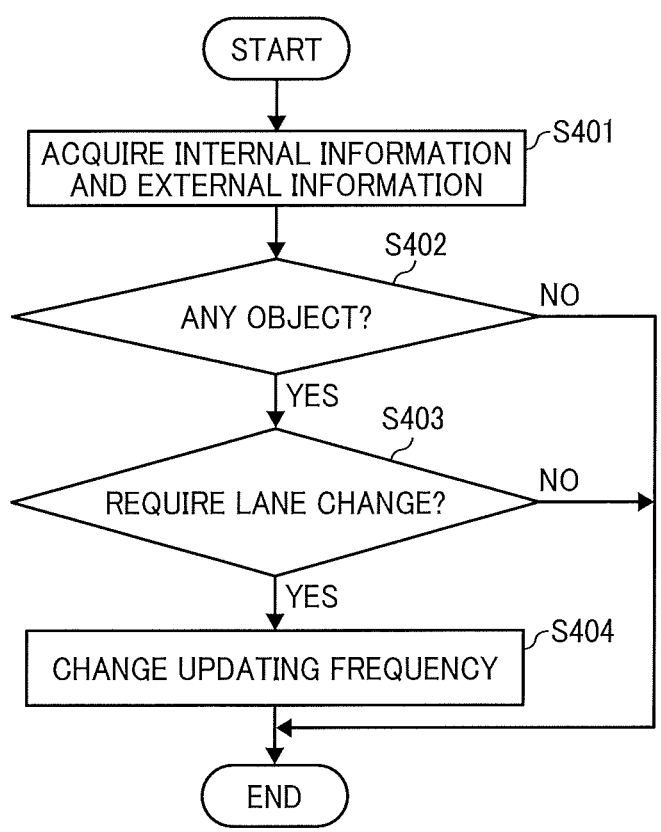
FIG. 20 is a flow chart describing steps of a process of changing graphically displayable information of a fifth embodiment.

FIG. 20 is a flow chart describing steps of a process of changing graphically displayable information of the fifth embodiment. As illustrated in FIG. 20, at step S401, the autonomous traveling control unit 820 acquires the internal information and the external information respectively from the internal information acquisition unit 810 and the external information acquisition unit 800. At step S402, the autonomous traveling control unit 820 determines whether an object exists in surrounding of the vehicle 900 based on the external information. When the autonomous traveling control unit 820 determines that the object exists in the surrounding of the vehicle 900, the sequence proceeds to step S403. When the autonomous traveling control unit 820 determines that the object does not exist in the surrounding of the vehicle 900, the sequence is ended.

At step S403, the autonomous traveling control unit 820 determines whether the lane change is required for the vehicle 900 based on information of the detected object and the internal information. When the autonomous traveling control unit 820 determines that the lane change is required for the vehicle 900, the sequence proceeds to S404. When the autonomous traveling control unit 820 determines that the lane change is not required for the vehicle 900, the sequence is ended. Further, when the autonomous traveling control unit 820 determines that the lane change is required for the vehicle 900, the autonomous traveling control unit 820 outputs, for example, a lane change signal to the image output unit 830.

At step S404, the image output unit 830 changes the updating frequency of the graphically displayable information. For example, when the image output unit 830 updates the graphically displayable information every 0.5 second before changing the lane (i.e., updating frequency is set lower), the image output unit 830 updates the graphically displayable information every 0.1 second after changing the lane (i.e., updating frequency is set higher). With this configuration, when the lane change is to occur due to the detected object, the graphically displayable information of the autonomous traveling route can be changed promptly. Therefore, the information processing system 1 can report to the vehicle operator V that the information processing system 1 detects the object and generates the autonomous traveling route, with which the vehicle operator V can further feel the sense of security.

Further, as to the above described embodiments, the shape of the graphical image indicating the autonomous traveling route is not limited to the circle and ellipse. For example, a triangle, an arrow, a part of circle and ellipse such as arc, and a continued line can be used as the shape of the graphical image indicating the autonomous traveling route. Further, the shape of the graphical image indicating others is not limited to the above described shape.

Further, the capabilities performed by the CPU 21 and the capabilities performed by the CPU 202 are not limited to the configuration of the above described embodiments, but can be set differently. For example, the capabilities performed by the CPU 21 and the capabilities performed by the CPU 202 can be integrated in the CPU 21, in which the CPU 21 that controls the autonomous traveling also controls an output of image information or the like.

As above described, the above described information processing system can report an autonomous traveling route to an operator of a vehicle during the autonomous traveling with a suitable display style at a suitable timing.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An information processing system, comprising:
   a memory to store information of a target objective set for a mobile apparatus; and
   circuitry, including a processor, to:
   acquire external information of the mobile apparatus,
   acquire internal information of the mobile apparatus,
   generate an autonomous traveling route of the mobile apparatus based on the external information, the internal information, and the information of the target objective,
   determine, based on the external information, whether an object exists on the autonomous traveling route,
   when the circuitry determines that the object does not exist on the autonomous traveling route,
   determine first display information based on the autonomous traveling route, convert, based on at least one of the external information and the internal information, the first display information to first image information, and output the first image information, determine, when the circuitry determines that the object exists on the autonomous traveling route and the circuitry acquires information related to the object, whether an alternative autonomous traveling route that evades the object is settable, and when the circuitry determines that the alternative autonomous traveling route is settable, determine second display information indicating the autonomous traveling route and the alternative autonomous traveling route, convert the second display information to second image information, the second image information indicating the autonomous traveling route and the alternative traveling route so that the alternative autonomous traveling route has any of a size, a color or a brightness different than the autonomous traveling route, and output the second image information.

2. The information processing system of claim 1, wherein the circuitry further:
updates the autonomous traveling route based on the external information and the internal information,
converts the updated autonomous traveling route to updated image information based on at least one of the external information and the internal information, and
outputs the updated image information.

3. The information processing system of claim 2, wherein when the information of the updated autonomous traveling route includes a lane change to evade the object, the circuitry displays a first travel route before updating the autonomous traveling route with a first style and a second travel route after updating the autonomous traveling route with a second style, different from the first style.

4. The information processing system of claim 2, wherein the circuitry changes an updating frequency of the autonomous traveling route based on the external information.

5. The information processing system of claim 2, wherein the circuitry changes an updating frequency of the autonomous traveling route based on a priority level of the object detected from the external information.

6. The information processing system of claim 2, wherein the circuitry increases an updating frequency when the information of the updated autonomous traveling route includes a lane change for evading the object.

7. The information processing system of claim 1, wherein when the circuitry acquires the information related to the object, the circuitry determines the second image information indicating an area that is required by the mobile apparatus to evade the object, and outputs the second image information indicating the area.

8. The information processing system of claim 1, wherein when the circuitry acquires the information related to the object, the circuitry determines the second image information indicating a position of the object, and outputs the second image information indicating the position of the object.

9. The information processing system of claim 1, wherein when the circuitry determines that the alternative autonomous traveling route that evades the object is not settable, the circuitry determines third image information indicating a message to stop of the mobile apparatus, and outputs the third image information indicating the message.

10. The information processing system of claim 1, wherein the second image information indicating the autonomous traveling route is information of a plurality of graphical images, and a size of the plurality of graphical images is gradually set smaller as the graphical images indicating a plurality of points configuring the autonomous traveling route becomes farther from a position of the mobile apparatus.

11. The information processing system of claim 10, wherein when the circuitry acquires information related to a traveling speed of the mobile apparatus as the internal information, the circuitry:
determines the second image information of the plurality of graphical images by adjusting any one of a size, a shape, a color and a brightness of the plurality of graphical images, and adjusting an interval of adjacent graphical images in the plurality of graphical images based on the traveling speed of the mobile apparatus, and
outputs the adjusted image information of the plurality of graphical images.

12. The information processing system of claim 11, wherein the circuitry:
determines the second image information of the plurality of graphical images by setting the interval of the adjacent graphical images broader as the traveling speed of the mobile apparatus becomes faster, and outputs the second image information of the plurality of graphical images, and
determines the second image information of the plurality of graphical images by setting the interval of the adjacent graphical images narrower as the traveling speed of the mobile apparatus becomes slower, and outputs the second image information of the plurality of graphical images.

13. The information processing system of claim 10, wherein when the circuitry acquires information related to a traveling speed of the mobile apparatus as the internal information, the circuitry:
determines the second image information of the plurality of graphical images by setting a higher display position as the traveling speed of the mobile apparatus becomes faster, and outputs the second image information of the plurality of graphical images, or
determines the second image information of the plurality of graphical images by setting a lower display position as the traveling speed of the mobile apparatus becomes slower, and outputs the second image information of the plurality of graphical images.

14. The information processing system of claim 1, wherein when the circuitry acquires information related to a surface that the mobile apparatus travels as the external information, the circuitry determines the first image information indicating the autonomous traveling route to be superimposed and displayed over the surface, and outputs the first image information indicating the autonomous traveling route.

15. The information processing system of claim 1, wherein
the second image information is information related to one or more graphical images indicating the autonomous traveling route, and
when the circuitry acquires information related to a surface that the mobile apparatus travels as the external information, the circuitry determines the second image information of the one or more graphical images indicating the autonomous traveling route by adjusting any one of a size, a shape, a color and a brightness of the one or more graphical images indicating the autonomous traveling route to fit the first image information of the one or more graphical images three dimensionally with the surface, and outputs the first image information of the one or more graphical images indicating the autonomous traveling route.

16. The information processing system of claim 1, wherein the external information includes information related to any one of a position, a size and a shape of the object existing in surroundings of the mobile apparatus.

17. An information display apparatus for an information processing system, the information display apparatus comprising:
   circuitry, including a processor, to:
      acquire external information of a mobile apparatus, the mobile apparatus settable with information of a target objective,
      acquire internal information of the mobile apparatus,
      acquire, from an external apparatus, information related to an autonomous traveling route of the mobile apparatus,
      determine, based on the external information, whether an object exists on the autonomous traveling route,
      when the circuitry determines that the object does not exist on the autonomous traveling route,
         determine first display information based on the autonomous traveling route, and
         convert, based on at least one of the external information and the internal information, the first display information to first image information,
      determine, when the circuitry determines that the object exists on the autonomous traveling route and the circuitry acquires information related to the object, whether an alternative autonomous traveling route that evades the object is settable, and
      when the circuitry determines that the alternative autonomous traveling route is settable,
         determine second display information indicating the autonomous traveling route and the alternative autonomous traveling route, and
         convert the second display information to second image information, the second image information indicating the autonomous traveling route and the alternative traveling route so that the alternative autonomous traveling route has any of a size, a color or a brightness different than the autonomous traveling route, and
   a projector to:
      when the circuitry determines the first image information, project the first image information to a transmissive surface for the mobile apparatus, and
      when the circuitry determines the second image information, project the second image information to the transmissive surface.

* * * * *